(12) United States Patent
DeMille et al.

(10) Patent No.: US 12,239,889 B2
(45) Date of Patent: *Mar. 4, 2025

(54) BINDER JET PRINTED GOLF CLUB COMPONENTS WITH LATTICE STRUCTURE

(71) Applicant: Callaway Golf Company, Carlsbad, CA (US)

(72) Inventors: Brandon D. DeMille, Carlsbad, CA (US); Eric Stubben, Encinitas, CA (US); David R. Handy, Encinitas, CA (US); Irina Ivanova, San Marcos, CA (US); Patrick Dawson, Poway, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/740,394

(22) Filed: May 10, 2022

(65) Prior Publication Data

US 2022/0305349 A1  Sep. 29, 2022

Related U.S. Application Data

(63) Continuation of application No. 17/327,483, filed on May 21, 2021, now Pat. No. 11,331,544.
(Continued)

(51) Int. Cl.
*A63B 53/04* (2015.01)
*B22F 3/10* (2006.01)
(Continued)

(52) U.S. Cl.
CPC ........ *A63B 53/045* (2020.08); *A63B 53/0416* (2020.08); *A63B 53/0433* (2020.08);
(Continued)

(58) Field of Classification Search
CPC .............. A63B 53/045; A63B 53/0416; A63B 53/0433; A63B 53/0437; A63B 53/0487;
(Continued)

(56) References Cited

U.S. PATENT DOCUMENTS 8,007,373 B2 * 8/2011 Soracco ................. A63B 60/00
473/349
9,925,440 B2 * 3/2018 Davis ..................... A63B 59/70
(Continued)

*Primary Examiner* — Sebastiano Passaniti
(74) *Attorney, Agent, or Firm* — Michael A. Catania

(57) ABSTRACT

Golf club components with complex such as lattice structures, beam structures, and complex surface-based structures, are described herein. A binder jet machine is used create complex structures within these golf club components to optimize weighting, sound, and performance of golf club heads. These components may be manufactured using a method that preferably includes the steps of designing a golf club head component in CAD using optimization software, printing the component from a powdered material, and then removing excess powder from the component via port holes that extend into an external surface of the component and communicate with interior voids within the component.

2 Claims, 32 Drawing Sheets

Related U.S. Application Data

(60) Provisional application No. 63/166,028, filed on Mar. 25, 2021.

(51) Int. Cl.

| | | |
|---|---|---|
| *B22F 10/14* | (2021.01) | |
| *B22F 10/68* | (2021.01) | |
| *B22F 10/80* | (2021.01) | |
| *B29C 64/165* | (2017.01) | |
| *B29C 64/35* | (2017.01) | |
| *B29C 64/386* | (2017.01) | |
| *B29C 64/393* | (2017.01) | |
| *B33Y 10/00* | (2015.01) | |
| *B33Y 40/20* | (2020.01) | |
| *B33Y 50/00* | (2015.01) | |
| *B33Y 50/02* | (2015.01) | |
| *G06F 30/10* | (2020.01) | |
| *A63B 102/32* | (2015.01) | |
| *B29L 31/52* | (2006.01) | |
| *B33Y 80/00* | (2015.01) | |
| *G06F 113/10* | (2020.01) | |
| *G06F 119/18* | (2020.01) | |

(52) U.S. Cl.
CPC ........ *A63B 53/0437* (2020.08); *B22F 3/1021* (2013.01); *B22F 10/14* (2021.01); *B22F 10/68* (2021.01); *B22F 10/80* (2021.01); *B29C 64/165* (2017.08); *B29C 64/35* (2017.08); *B29C 64/386* (2017.08); *B29C 64/393* (2017.08); *B33Y 10/00* (2014.12); *B33Y 40/20* (2020.01); *B33Y 50/00* (2014.12); *B33Y 50/02* (2014.12); *G06F 30/10* (2020.01); *A63B 53/0458* (2020.08); *A63B 53/0466* (2013.01); *A63B 53/047* (2013.01); *A63B 53/0475* (2013.01); *A63B 53/0487* (2013.01); *A63B 2102/32* (2015.10); *A63B 2209/00* (2013.01); *B29L 2031/52* (2013.01); *B33Y 80/00* (2014.12); *G06F 2113/10* (2020.01); *G06F 2119/18* (2020.01)

(58) Field of Classification Search
CPC ............ A63B 53/0466; A63B 2102/32; A63B 53/0475; A63B 53/0458; A63B 53/047; A63B 2209/00; B33Y 80/00; B33Y 10/00; B22F 10/14
USPC .................................. 473/324–350, 287–292
See application file for complete search history.

(56) References Cited

U.S. PATENT DOCUMENTS

| | | | |
|---|---|---|---|
| 10,343,031 B1* | 7/2019 | Day | A63B 53/0433 |
| 10,835,788 B1* | 11/2020 | Rice | A63B 53/0416 |
| 10,835,789 B1* | 11/2020 | DeMille | A63B 53/0487 |
| 11,331,544 B1* | 5/2022 | DeMille | A63B 53/0433 |
| 11,484,757 B1* | 11/2022 | DeMille | B33Y 80/00 |
| 11,497,973 B1* | 11/2022 | DeMille | A63B 53/0487 |
| 11,511,166 B1* | 11/2022 | Roach | A63B 53/0454 |
| 11,524,213 B1* | 12/2022 | Roach | B22F 5/10 |
| 11,607,735 B1* | 3/2023 | DeMille | B33Y 50/00 |
| 11,618,079 B1* | 4/2023 | Roach | A63B 53/04 |
| 11,786,784 B1* | 10/2023 | DeMille | A63B 53/0454 473/347 |
| 11,878,221 B1* | 1/2024 | DeMille | G06F 30/10 |
| 2013/0072321 A1* | 3/2013 | Morales | B23K 20/233 228/159 |
| 2014/0274459 A1* | 9/2014 | Kronenberg | A63B 53/04 473/345 |
| 2017/0185070 A1* | 6/2017 | Kronenberg | B22F 3/1115 |
| 2019/0184250 A1* | 6/2019 | Rouzier | A63B 59/70 |
| 2019/0375008 A1* | 12/2019 | Barua | B22F 10/43 |
| 2020/0016461 A1* | 1/2020 | Spackman | A63B 53/0458 |
| 2020/0086386 A1* | 3/2020 | Koehler | B22F 10/38 |

* cited by examiner

BINDER JET PRINTED GOLF CLUB COMPONENTS WITH LATTICE STRUCTURE

CROSS REFERENCES TO RELATED APPLICATIONS

The present application is a continuation of U.S. patent application Ser. No. 17/327,483, filed on May 21, 2021, and issued on May 17, 2022, as U.S. Pat. No. 11,331,544, which claims priority to U.S. Provisional Application No. 63/166,028, filed on Mar. 25, 2021, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to methods of manufacturing golf club components with complex structures that are difficult, impossible, or cost prohibitive to produce via prior art methods, such as cell-based lattice patterns, beam-based structures, and complex surface-based structures, and golf club components, including golf club heads, manufactured to include such patterns and/or structures.

Description of the Related Art

Traditional manufacturing processes, which include investment casting, injection molding, compression molding, metal injection molding, forging, stamping, and forming place many constraints on the design of golf club heads and club head components, preventing manufacturers from fully customizing and optimizing their products. Some of these constraints include draw direction, taper, minimum wall thickness, draft angles, minimum radii, and maximum feature height.

Typical additive manufacturing techniques, also known as 3D printing, can eliminate or reduce the severity of these constraints, but have their own drawbacks. For example, direct metal laser sintering (DMLS), direct metal laser melting (DMLM), and electron beam additive manufacturing (EBAM) use controlled energy sources, including lasers and electron beams in which intense, extremely localized heat is applied to metal powder to melt and/or sinter adjacent particles together. This intense heat tends to cause warping, porosity (which creates inconsistent density throughout the part), distortion, surface defects, and even cracking of the parts during the build process, even when the laser intensity, focal length, and path speed are optimal.

Other characteristics of these techniques include using very small moving points to build parts, provide limited solutions for removing excess powder from the finished part, require significant post-processing to remove supports and support footprints on the surface, and require a very specific grade of metal powder (e.g., smaller than 40 microns, spherical particles) for high resolution and to guarantee an even sintering and a relatively smooth surface finish. These characteristics render these techniques suboptimal and cost-prohibitive for golf club manufacturing purposes.

The most significant drawback of the DMLS and DMLM techniques is the constraint they place on overhang angle, examples of which are shown in FIG. 41. As golf club parts are built, structures created by the prior art additive manufacturing techniques described above are not self-supporting, with thin beads of sintered material tending to sag and fall if they are not supported by connections to the build plate or another portion of the part that has already been fully sintered. As a result, a typical design requirement is that all surfaces be no more than 45° from the build axis, but the limit is typically 30-60°. The only alternative to the overhang angle design requirement is to add supports to the structure to help prevent sagging during the build process. The supports used for DMLS, DMLM, and EBAM are metal and are directly connected to the part, and are difficult to remove without negatively affecting the surface finish on the part or creating a large opening in the club head.

The overhang angle constraint dramatically limits the potential of otherwise promising designs that are based on modern generative design techniques like topology optimization. It also severely limits the types, orientations and sizes of cells that can be manufactured to form lattices. Even when a designer settles on a cell type that satisfies the overhang constraint, there is often no room for further optimization of the lattice via purposeful warping, skewing or otherwise stretching portions of the lattice to generate an improved design. It is also impractical to use metal supports to make fine lattice structures feasible to manufacture. If a lattice were to include overhanging beams and the beams are supported, the supports would be impossible to remove.

As described above, the prior does not provide additive manufacturing techniques that are optimized for creation of golf club components. Therefore, there is a need for a 3D printing method that creates high quality, high performing golf club heads and also allows for the easy removal of excess printing material.

BRIEF SUMMARY OF THE INVENTION

One aspect of the present invention is a method of manufacturing a golf club head or golf club component comprising cell-based lattice patterns, beam-based structures, and/or complex surface-based structures using a binder jet process. This method may comprise the use of optimization software to prepare at least one CAD model of a golf club head component.

Another aspect of the present invention is a golf club component comprising a lattice structure. In some embodiments, the lattice support structure is a component that is affixed to a golf club head having higher density weighting in optimal positions for improved mass properties.

Yet another aspect of the present invention is a method of removing excess powder from a printed golf club component, the method comprising placing one or more holes in one or more strategic locations on said golf club parts, shaking or otherwise removing powder from these holes, and then covering the holes on the golf club parts. In some embodiments, the golf club head component may comprise a plurality of interconnected interior voids, and at least one of the port holes may communicate with at least one of the plurality of interconnected interior voids.

Another aspect of the present invention is a method comprising the steps of using optimization software to prepare, modify, influence, or guide the design of a golf club component comprising a plurality of port holes extending into an external surface of the golf club component, providing a powdered material, binder jetting said golf club component from the powdered material based on the design, and removing excess powdered material from the golf club component via the port holes. The step of removing excess powdered material from the golf club component via the port holes may comprise the steps of shaking the golf club component and polishing the golf club component. In a further embodiment, the golf club component may comprise a plurality of interconnected interior voids, and at least one of the port holes may communicate with at least one of the plurality of interconnected interior voids. In another embodiment, the method may further comprise the step of covering up the port holes, which may include the step of permanently affixing (e.g., via welding, bonding, brazing, etc.) the golf club component to another golf club part, such as a medallion. In any of the embodiments, the golf club component may be a golf club head. Also in any of the embodiments, the step of utilizing optimization software may comprise capturing the design in a CAD model, and the step of binder jetting may utilize the CAD model.

Another aspect of the present invention is a golf club head component comprising an external surface, a lattice structure comprising a plurality of voids, and a plurality of port holes extending into the external surface, wherein at least one of the plurality of port holes communicates with at least one of the plurality of voids, and wherein the lattice structure is at least partially bounded by the external surface. In some embodiments, each of the plurality of port holes may communicate with at least one of the plurality of voids. In other embodiments, the lattice structure may be completely enclosed by the external surface.

Yet another aspect of the present invention is a golf club head comprising a metal body comprising a front opening, a metal face insert comprising a striking face, a rear face opposite the striking face, an edge surface extending between the striking face and the rear face, a plurality of port holes extending into the edge surface, and an internal structure comprising a plurality of voids, and a weld seam disposed between the edge surface and the body, wherein at least one of the plurality of port holes communicates with at least one of the plurality of voids, wherein the weld seam covers at least one of the plurality of port holes, and wherein the face insert is disposed within the front opening. In some embodiments, the weld seam may cover each of the plurality of port holes. In other embodiments, each of the plurality of port holes may communicate with at least one of the plurality of voids. In still other embodiments, the body may comprise a lattice structure. In any of the embodiments, the face insert may comprise a variable thickness pattern.

Another embodiment of the present invention is a method comprising the steps of spreading layers of powdered material across a portion of a binder jet machine, depositing liquid binder on regions of each layer of powder so that the binder bonds adjacent particles of powdered material together, repeating the spreading and depositing steps until a green part is formed, and sintering the green part to create a final part, wherein the final part is a golf club component. In a further embodiment, the method may comprise the step of removing binder via a debinding process, which step may occur prior to the sintering step. In a further embodiment, the removing step and the sintering step may occur in the same furnace. In another, further embodiment, the method may comprise the step of preparing design parameters for the golf club component using optimization software, which step may occur before all other steps of the method. In a further embodiment, the preparing step may comprise inputting into the optimization software at least one parameter, which may be selected from the group consisting of individual player measurements, club head delivery data, impact location, and historical player data.

In any of the embodiments, the final part may be 5-50% or 10-25% smaller than the green part, and the final part may have a material density greater than 90%. Also in any of the embodiments, the powdered material may be a non-metal material, which may be selected from the group consisting of nylon, polycarbonate, polyetherimide, polyetheretherketone, and polyetherketoneketone. In another embodiment, the final part may comprise a lattice structure and have a uniform final material density of at least 90%. In an alternative embodiment, the final part may comprise complex surface-based structures. In any of the embodiments, the golf club component may be a golf club head.

Yet another embodiment of the present invention is a golf club head comprising a component with a lattice structure, wherein the lattice structure comprises a plurality of cells comprising geometrically designed-in voids, and wherein at least one of the voids is empty. In some embodiments, the lattice structure may comprise a uniform final material density of at least 90%. In other embodiments, the lattice structure may comprise a plurality of non-ordered beams. In some embodiments, at least 25% of the cells of the plurality of cells may have identical dimensions. In other embodiments, at least 25% of the cells of the plurality of cells may have a characteristic different from all other cells of the plurality of cells, which characteristic may be selected from the group consisting of size, aspect ratio, skew, and beam diameter. In a further embodiment, a change rate between adjacent cells may be at least 10%.

In another embodiment, the lattice structure may comprise a plurality of beams, each of which may have a cross sectional shape selected from the group consisting of circular and elliptical and a diameter that is selected from the group consisting of constant and tapered. In still other embodiments, the lattice structure may comprise a region with a characteristic selected from the group consisting of warped, twisted, distorted, curved, and stretched. In still other embodiments, at least one cell of the plurality of cells may have a volume that is three to five times the equivalent diameter of the nearest beam. In any of the embodiments, the lattice structure may be composed of a non-metal material. In an alternative embodiment, the lattice structure may be composed of a metal alloy material selected from the group consisting of aluminum alloy, magnesium alloy, titanium alloy, and stainless steel. In any of the embodiments, the plurality of cells may comprise a series of connected tetrahedral cells, which may be non-ordered. In other embodiments, the component may be selected from the group consisting of a face insert, a sole insert, and a crown insert. In other embodiments, the component may have an effective density of 1-90%.

Another aspect of the present invention is a golf club component comprising complex surface-based structures. In some embodiments, the component may be selected from the group consisting of a face insert, a sole insert, and a crown insert. In other embodiments, the complex surface-based structures may be selected from the group consisting of TPMS and gyroids. In a further embodiment, the component may also comprise at least one lattice structure.

Yet another aspect of the present invention is a putter head comprising a body composed of a first material having a first density, the body comprising a face portion, a top portion, and a sole portion with a sole recess, a sole insert composed of a second material having a second density, and at least one weight composed of a third material having a third density, wherein the second density is less than the first density, wherein the third density is greater than the first density, wherein the sole insert comprises at least one of a lattice structure and a complex surface-based structure, and wherein the at least one weight is affixed to the sole portion.

In some embodiments, the lattice structure may comprise a plurality of beams, each of which may have a cross sectional shape selected from the group consisting of circular and elliptical, and a diameter selected from the group consisting of constant and tapered. In other embodiments, each of the sole insert and the at least one weight insert may be disposed within the sole recess. In any of the embodiments, the sole insert may be composed of a non-metal material, and in a further embodiment, the non-metal material may include reinforcing fibers. In a further embodiment, the putter head may include a face insert, which may be permanently affixed within a recess in the face portion. In any of the embodiments, the third material may comprise tungsten. In other embodiments, the sole insert may be bonded within the sole recess, and may only partially fill the sole recess.

Another aspect of the present invention is a golf club head comprising a body comprising a face portion, an upper portion, and a sole portion defining an interior cavity, and a structure comprising at least one of a lattice structure and a complex surface-based structure, wherein the body is composed of a first material having a first density, wherein the structure is entirely contained within the interior cavity, wherein at least one surface of the structure is curved, and wherein the structure connects to an interior surface of the sole portion. In some embodiments, the structure may be composed of a second material having a second density that is different from the first density. In other embodiments, the structure may be integrally formed with the body. In another embodiment, the structure may comprise a lattice structure, which may comprise a plurality of beams, each of which may have a cross sectional shape selected from the group consisting of circular and elliptical, and a diameter selected from the group consisting of constant and tapered.

Yet another embodiment of the present invention is an iron club head comprising a body comprising a striking face, a top rail, a sole portion, and a rear cavity, and an insert comprising at least one of a lattice structure and a complex surface-based structure, wherein the insert is disposed within and fills the rear cavity. In some embodiments, the insert may comprise a lattice structure, which may comprise a plurality of cells comprising geometrically designed-in voids, and at least one of the voids may be empty.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is directed to improved methods of printing golf club components and golf club heads, and particularly the use of a binder jet machine to create complicated support structures from various materials that improve the support, mass distribution, and acoustics of the golf club heads, while allowing for the easy removal of unused powder.

Binder Jet Process

Figure 1:
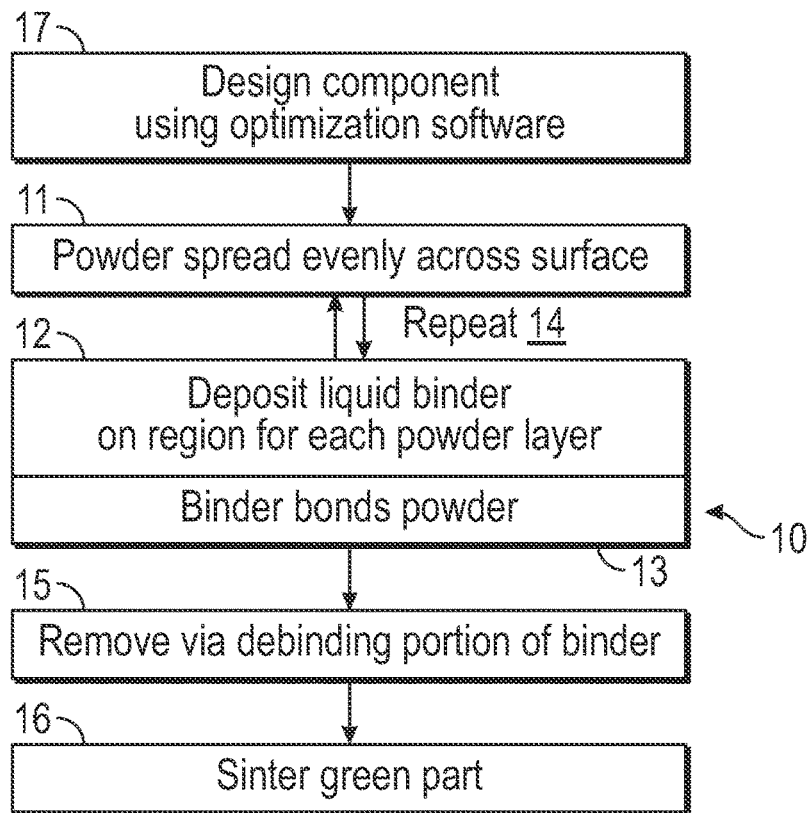
FIG. 1 is a process flow chart illustrating a binder jetting process.
Figure 2:
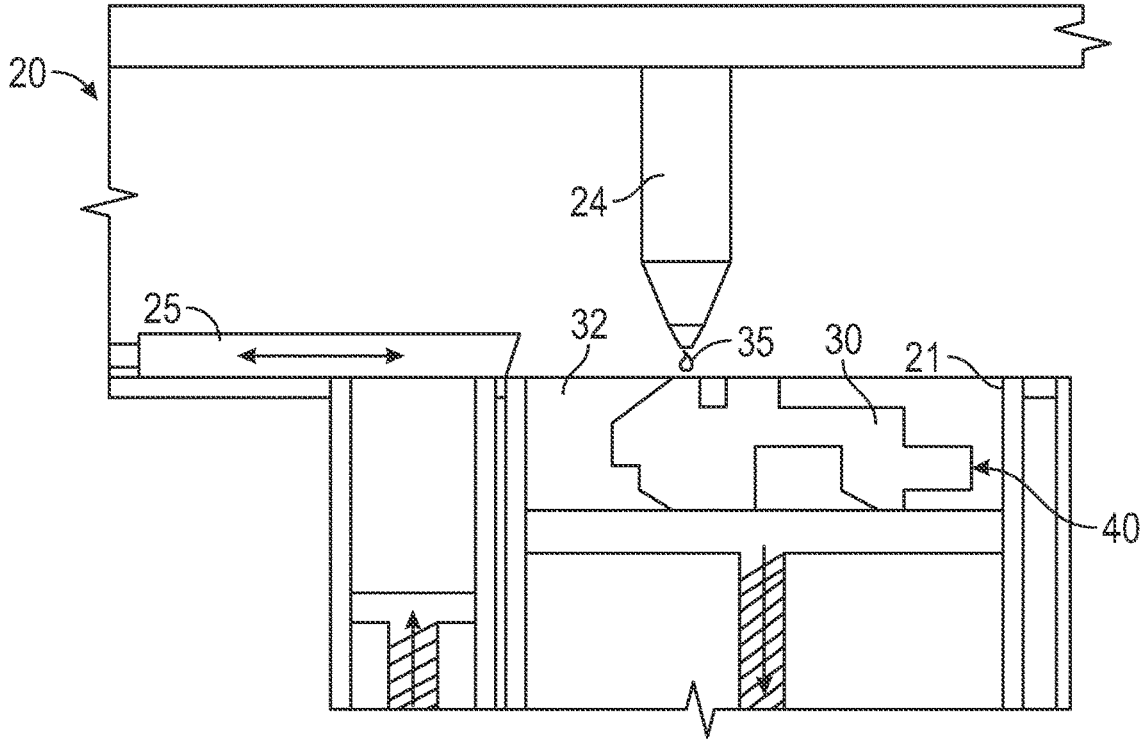
FIG. 2 is an image of an exemplary binder jet machine.
Figure 3:
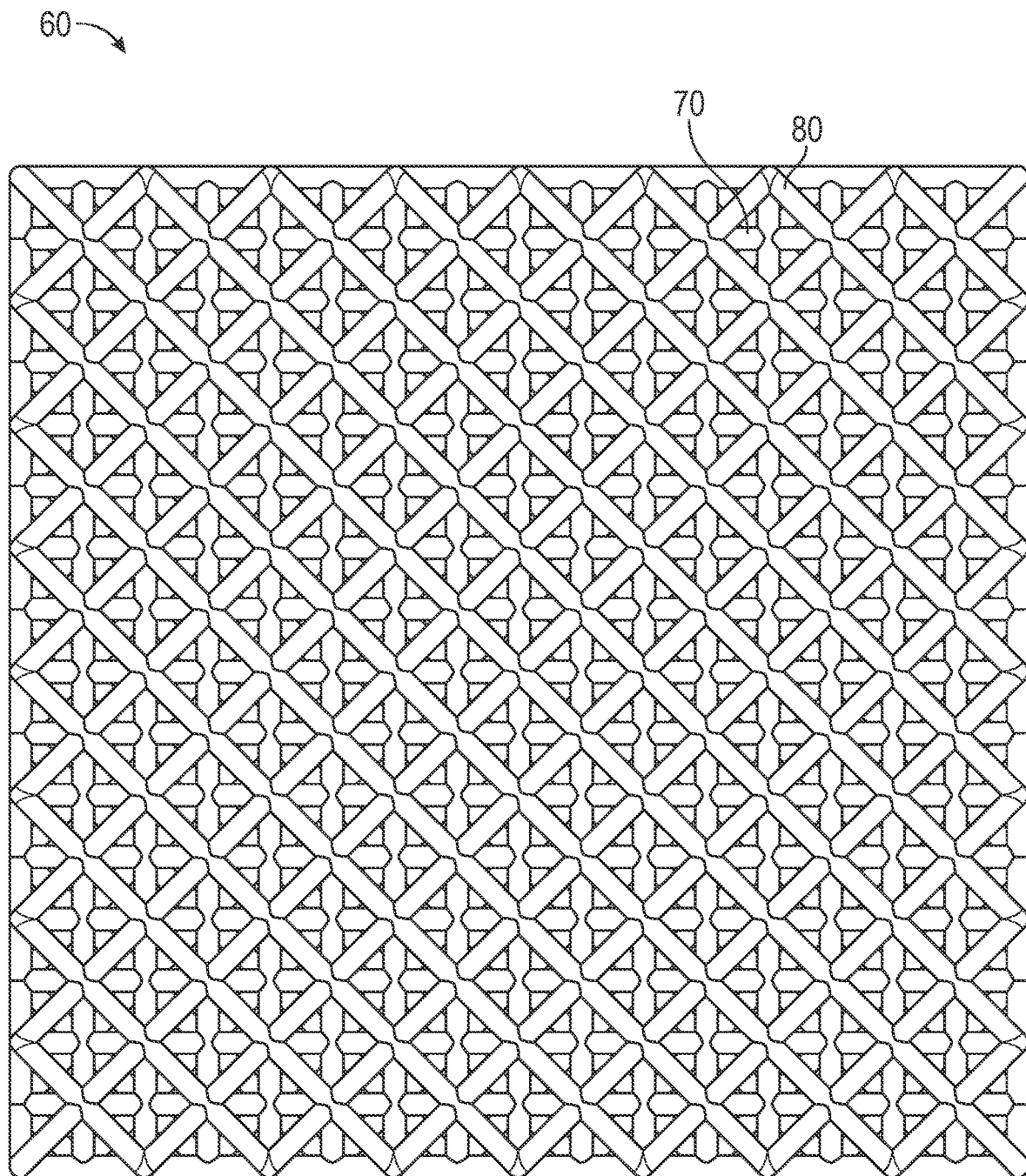
FIG. 3 is a top plan view of a uniform lattice pattern.
Figure 4:
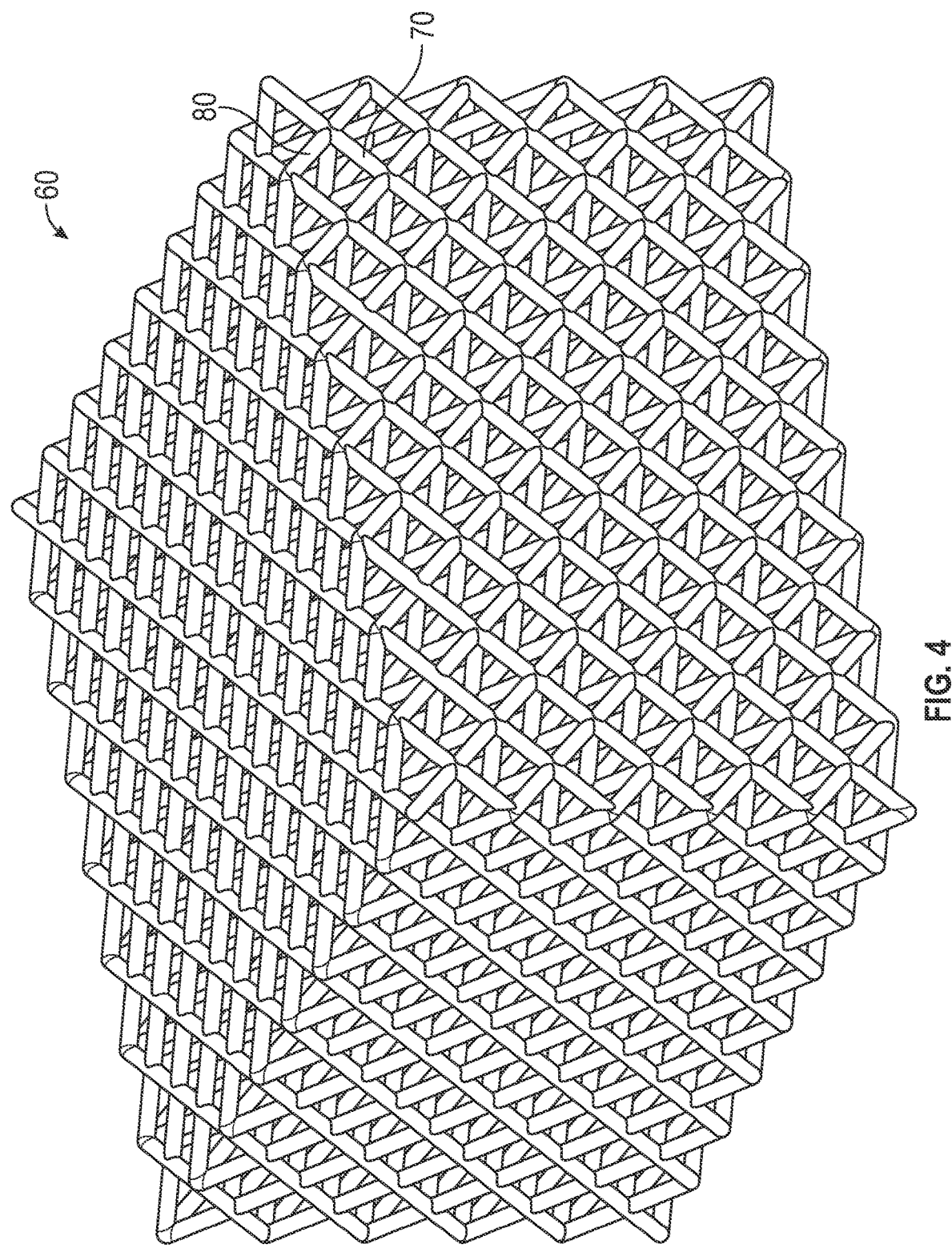
FIG. 4 is a side perspective view of the lattice pattern shown in FIG. 3.
Figure 5:
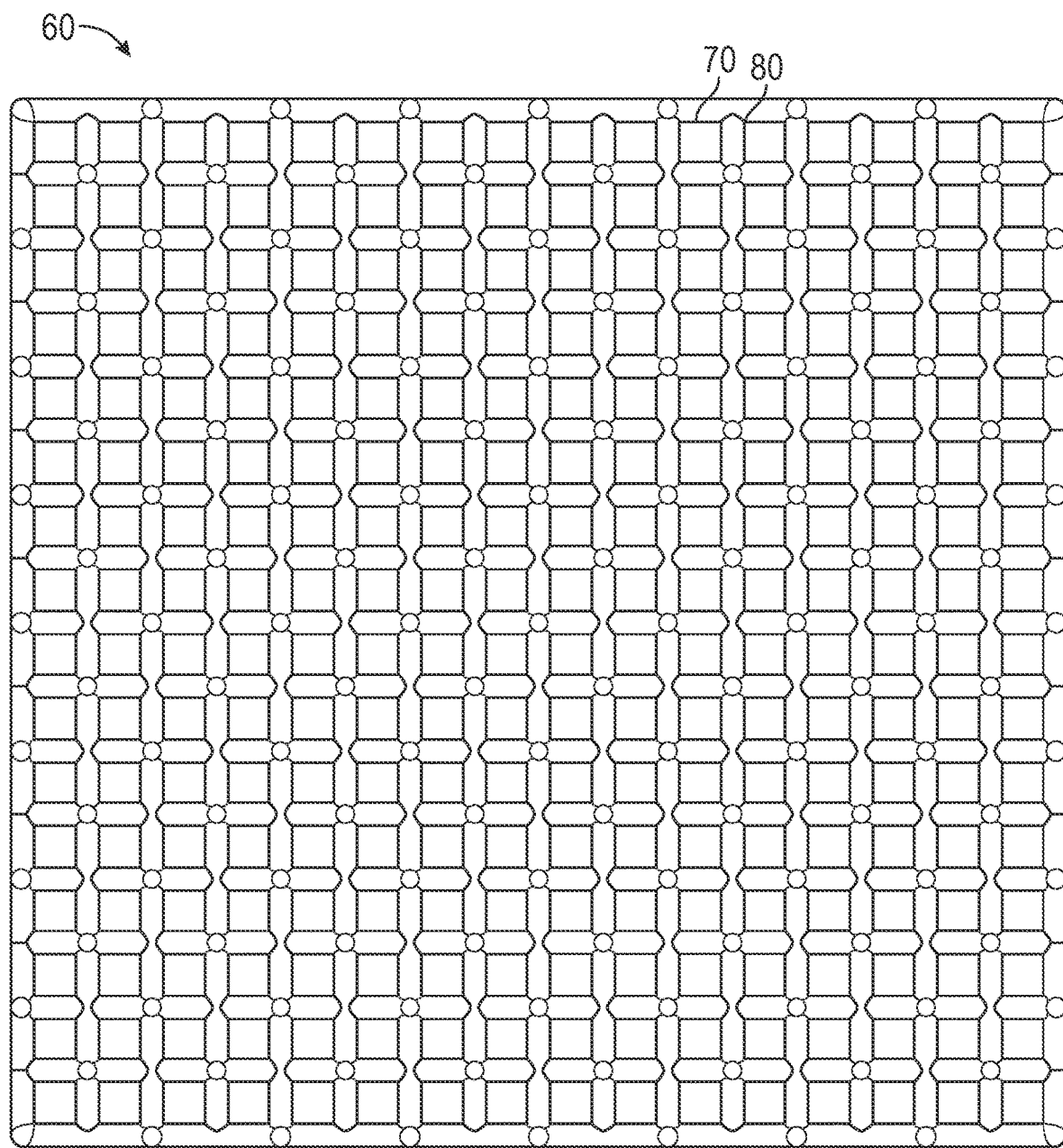
FIG. 5 is a top plan, 40° filtered from XY plane view of the lattice pattern shown in FIG. 3.
Figure 6:
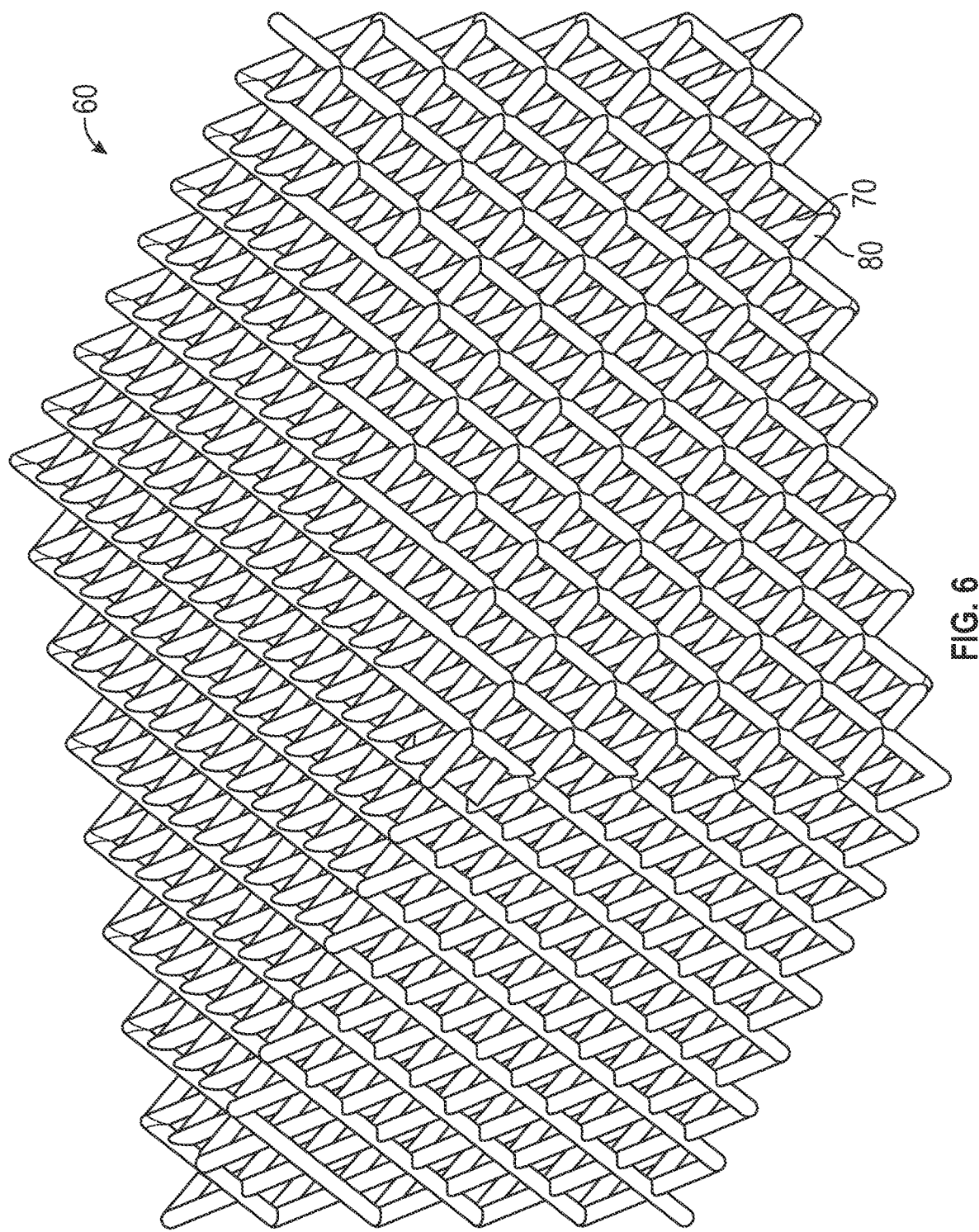
FIG. 6 is a side perspective view of the lattice pattern shown in FIG. 5.
Figure 7:
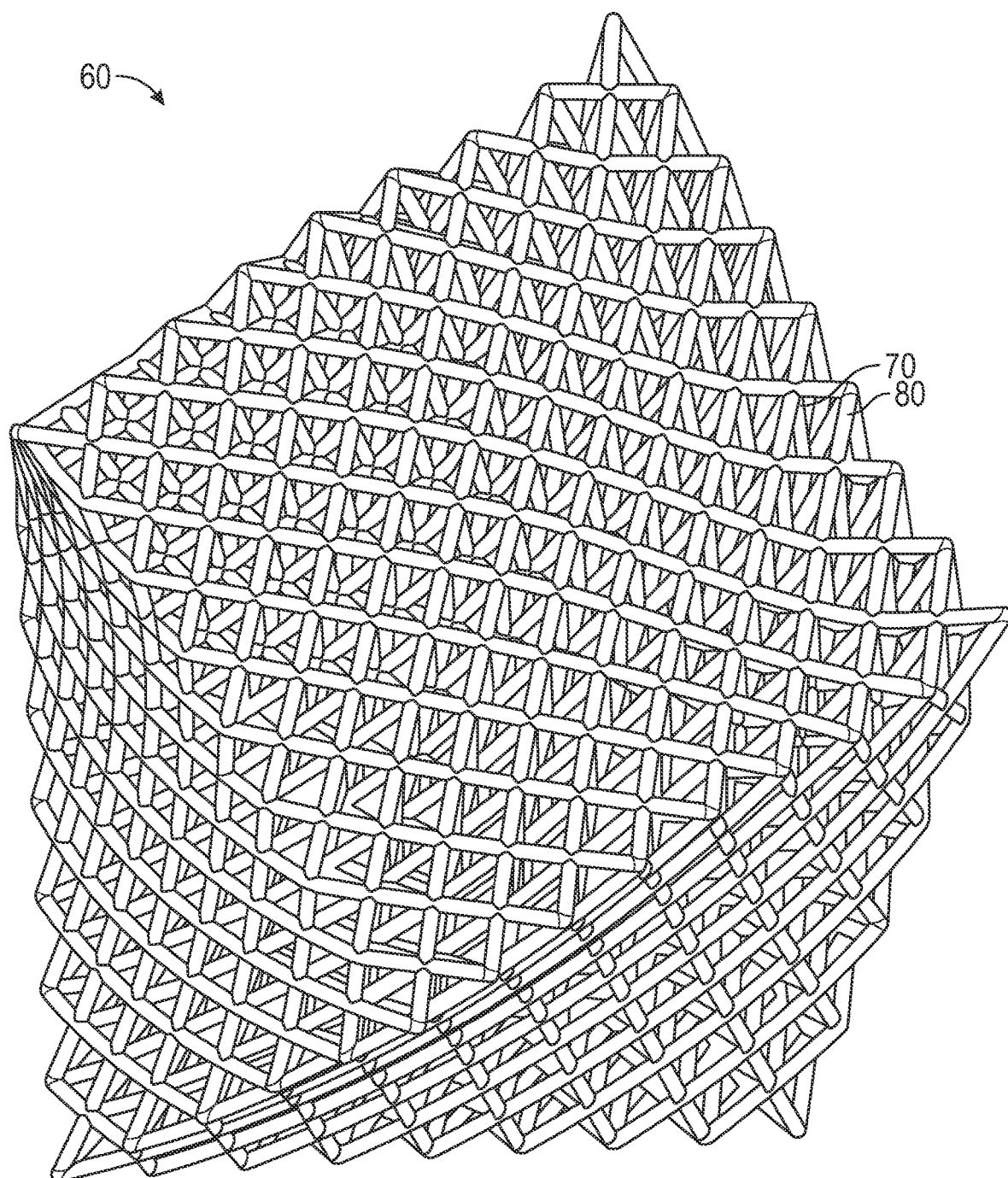
FIG. 7 is a top perspective view of a twisted lattice pattern.
Figure 8:
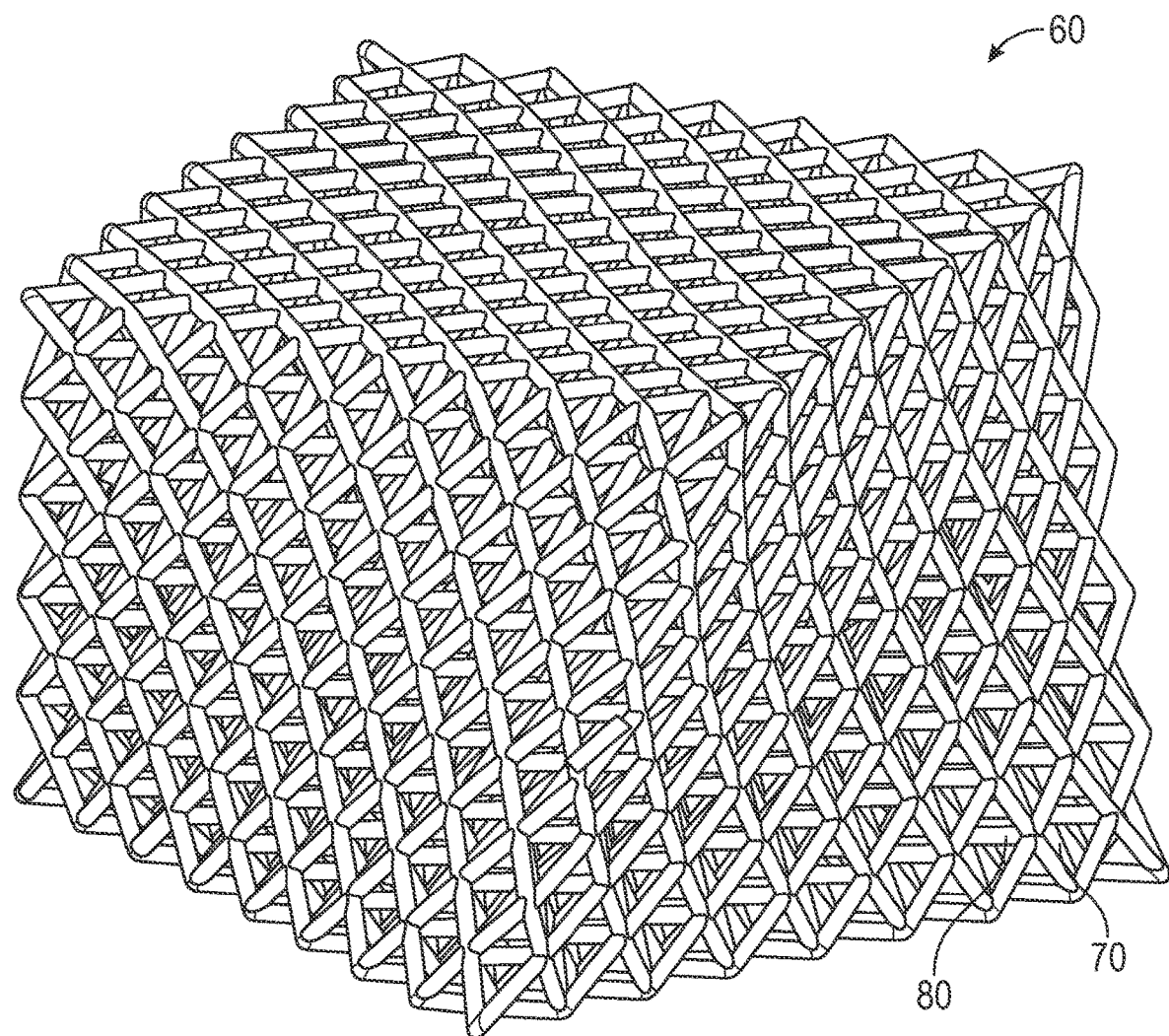
FIG. 8 is a side perspective view of the lattice pattern shown in FIG. 7.
Figure 9:
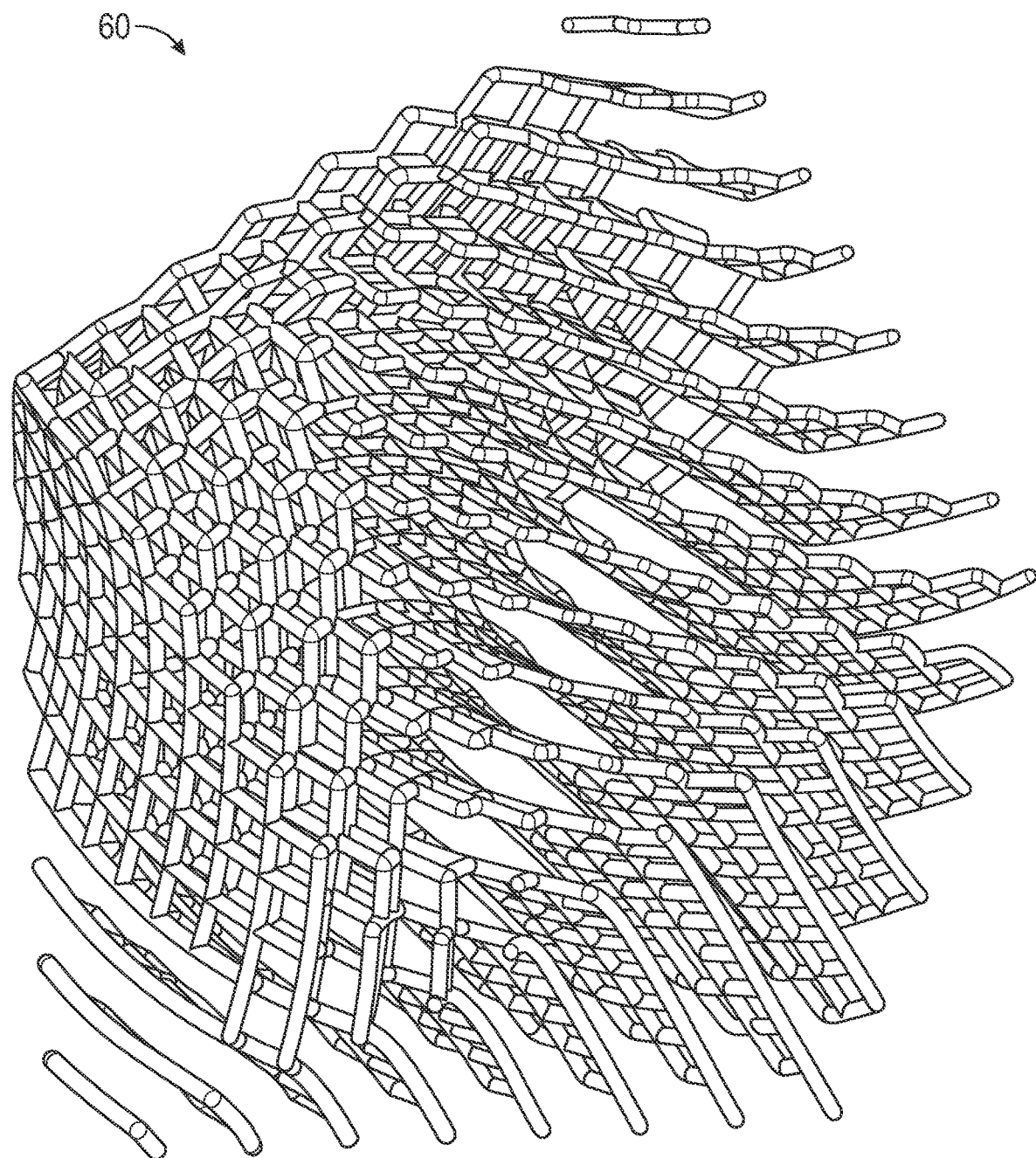
FIG. 9 is a top perspective, 40° filtered from XY plane view of the lattice pattern shown in FIG. 7.
Figure 10:
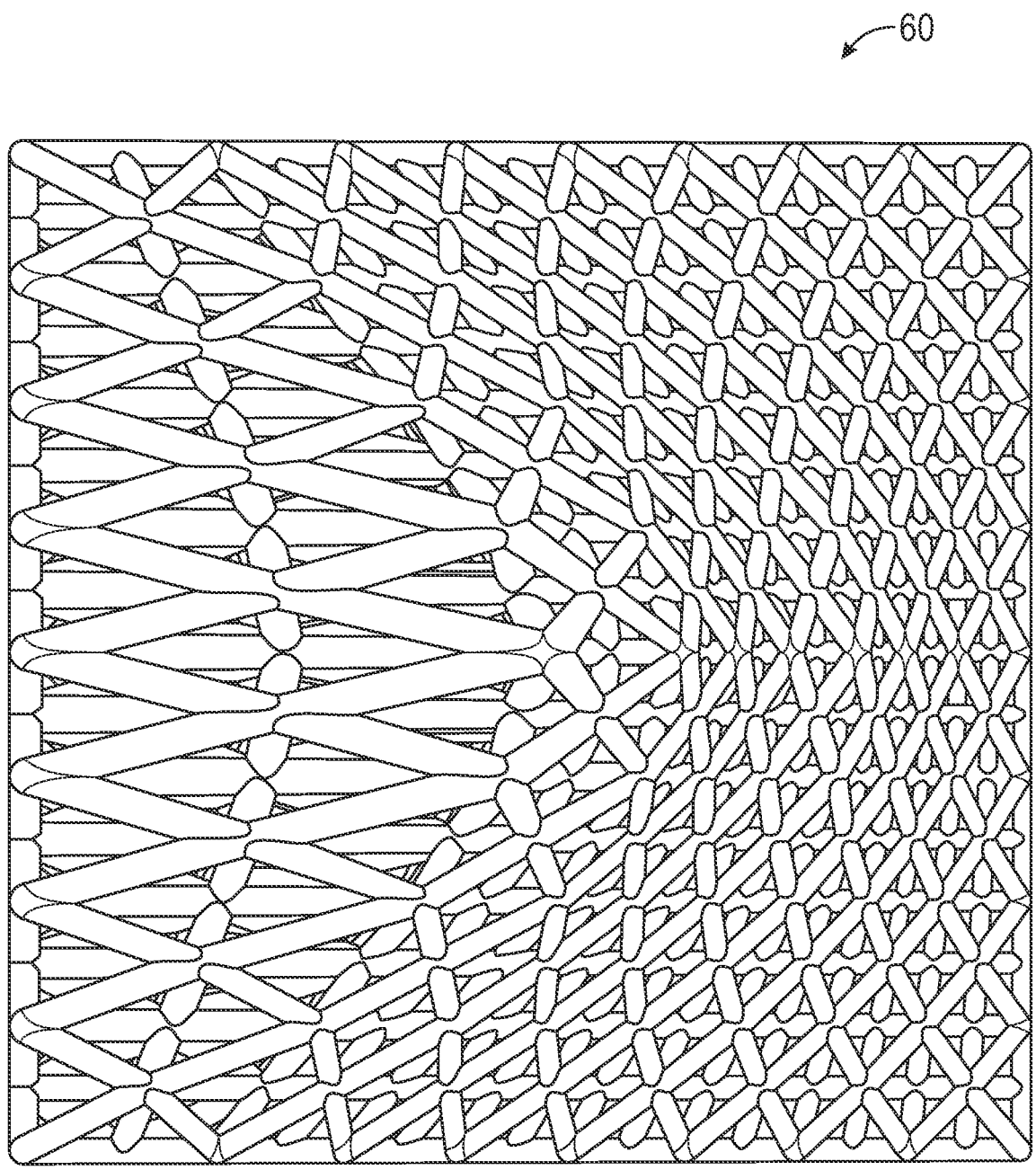
FIG. 10 is a top plan view of a variable density lattice pattern.
Figure 11:
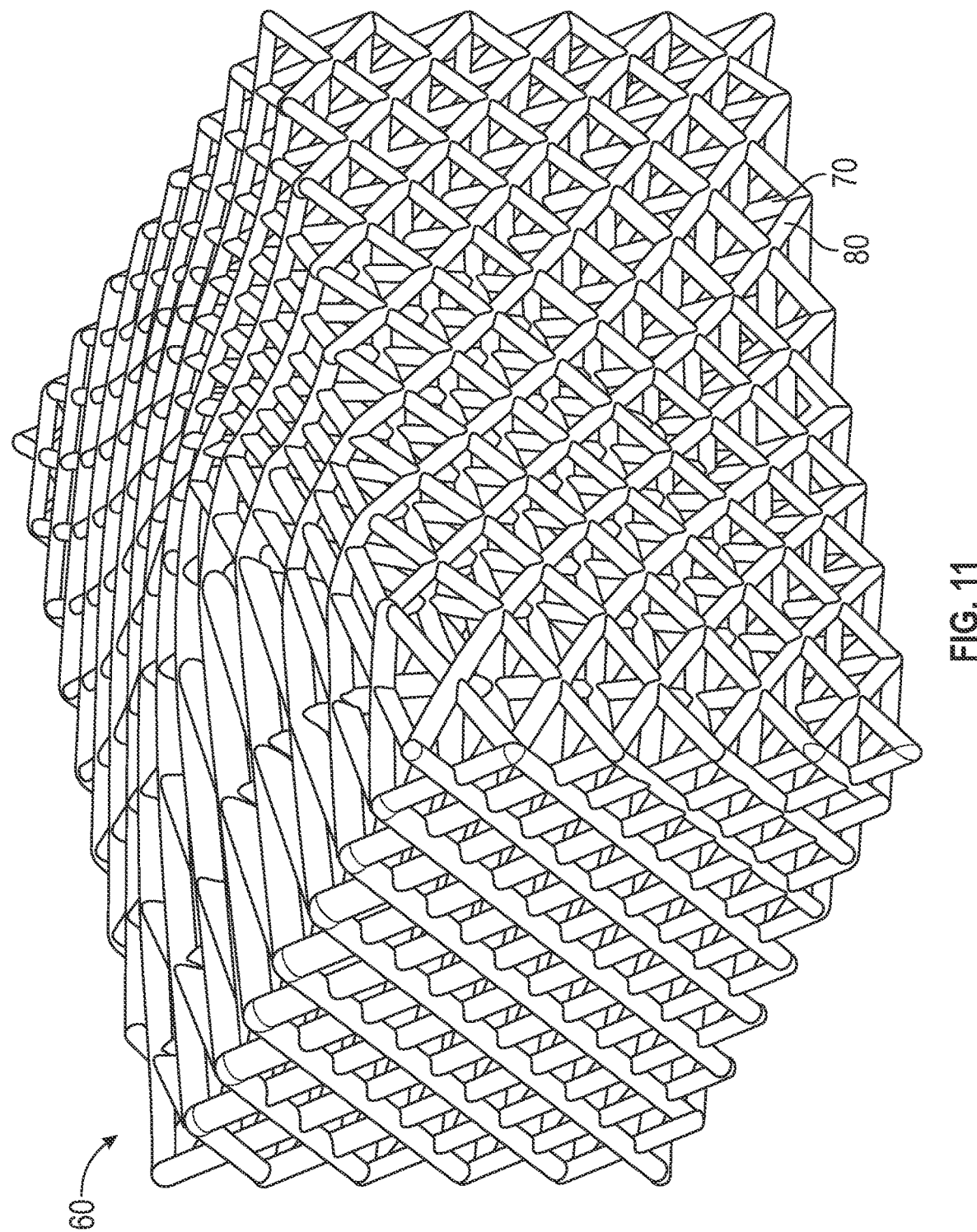
FIG. 11 is a side perspective view of the lattice pattern shown in FIG. 10.
Figure 12:
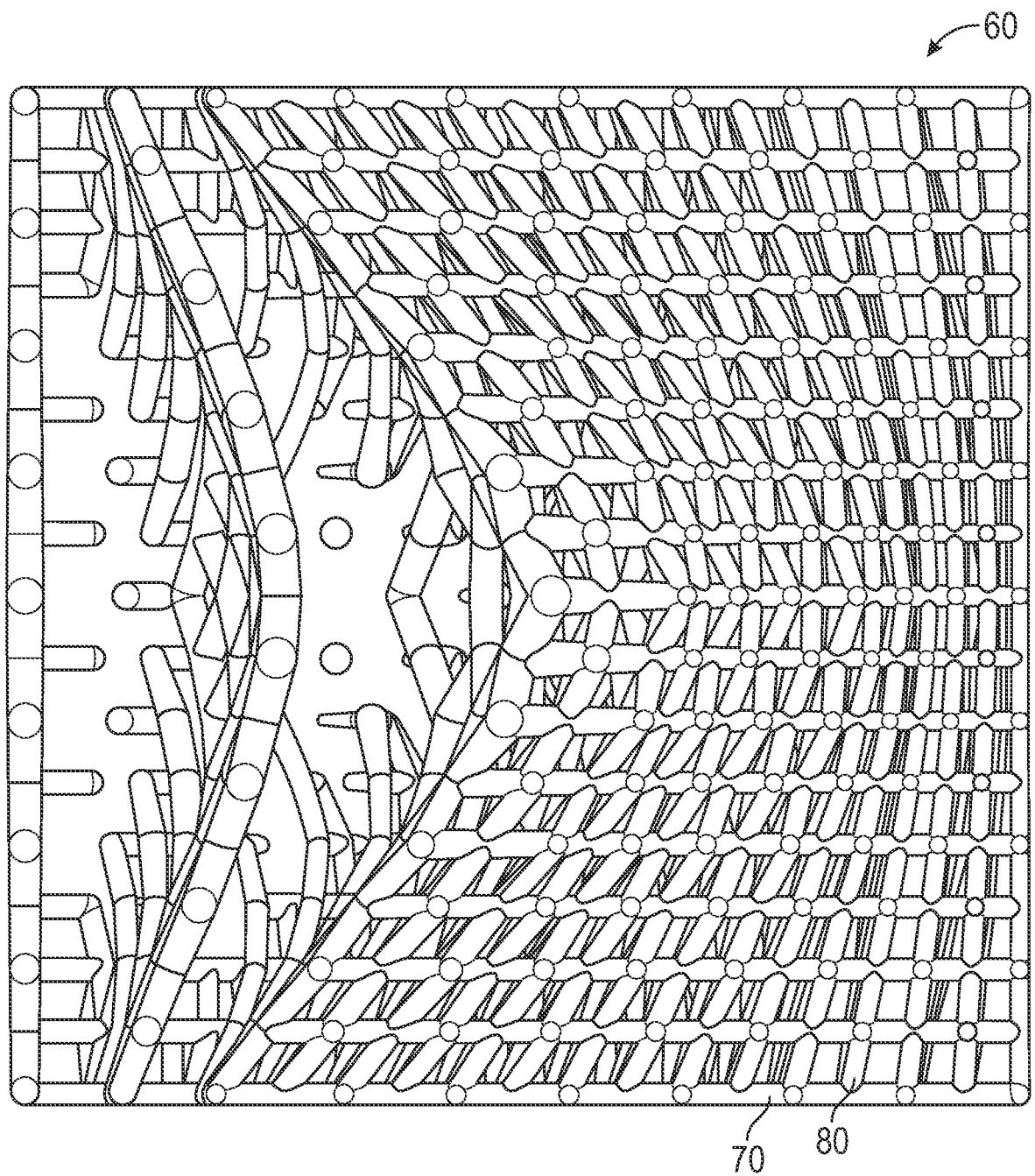
FIG. 12 is a top plan, 40° filtered from XY plane view of the lattice pattern shown in FIG. 10.
Figure 13:
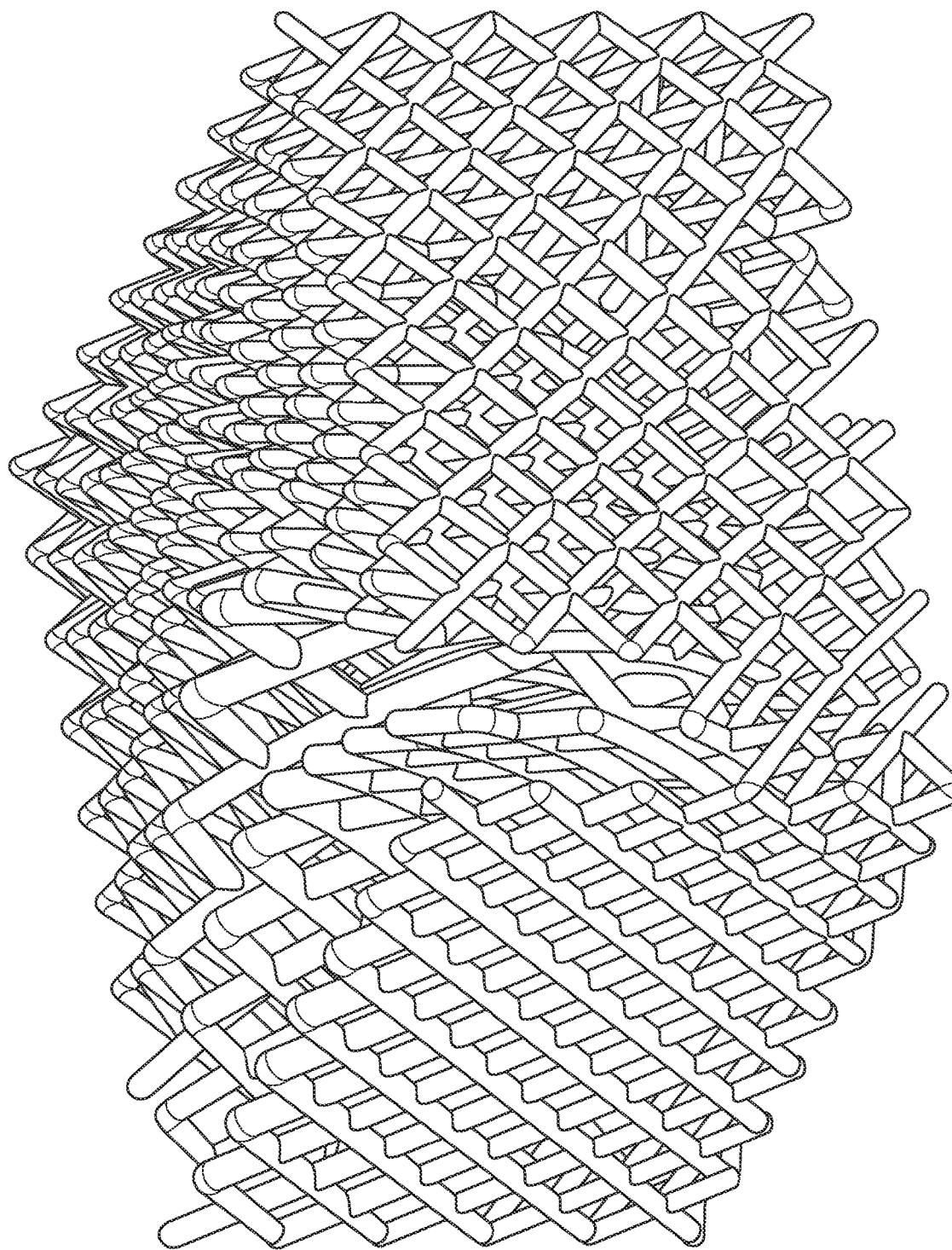
FIG. 13 is a side perspective view of the lattice pattern shown in FIG. 12.

As illustrated in FIGS. 1 and 2, the binder jet process 10 includes a first step 11 of spreading layers of powder 30 evenly across the build plate 22 of a binder jet machine 20; this step can be performed manually or with a re-coater or roller device 25. This occurs in the build box 21 portion of the binder jet machine 20, where a build plate 22 lowers as each layer of powder 30 is applied. In a second step 12, a printer head 24 deposits liquid binder 35 on the appropriate regions for each layer of powder 30, leaving unbound powder 32 within the build box 21. In a third step 13, the binder bonds adjacent powder particles together. In a fourth step 14, the first and second steps 11, 12 are repeated as many times as desired by the manufacturer to form a green (unfinished) part 40 with an intended geometry.

In an optional fifth step 15, a portion of the binder 35 is removed using a debinding process, which may be via a liquid bath or by heating the green part to melt or vaporize the binder. In a sixth step 16, the green part 40 is sintered in a furnace, where, at the elevated temperature, the metal particles repack, diffuse, and flow into voids, causing a contraction of the overall part. As this sintering step 16 continues, adjacent particles eventually fuse together, forming a final part, examples of which (reference characters 140, 250, 350, and 400) are shown in FIGS. 24-40. This process causes 10-25% shrinkage of the part from the green state 40 to its final form 50, and the final part has a void content that is less than 10% throughout. In some embodiments, the debinding and sintering steps 15, 16 may be conducted in the same furnace. In an optional step 17, before the binder jet process 10 begins, optimization software can be used to design a high performance club head or component in CAD. This step allows the manufacturer to use individual player measurements, club head delivery data, and impact location in combination with historical player data and machine learning, artificial intelligence, stochastic analysis, and/or gradient based optimization methods to create a superior club component or head design.

Though binder jetting is a powder-based process for additive manufacturing, it differs in key respects from other directed energy powder based systems like DMLS, DMLM, and EBAM. The binder jet process 10 provides key efficiency and cost saving improvements over DMLM, DMLS, and EBAM that makes it uniquely suitable for use in golf club component manufacturing. For example, binder jetting is more energy efficient because it is not performed at extremely elevated temperatures and is a much less time consuming process, with speeds up to one hundred times faster than DMLS. The secondary debinding step 15 and sintering step 16 are batch processes which help keep overall cycle times low, and green parts 40 can be stacked in a binder jet machine 20 in three dimensions because the powder is generally self-supporting during the build process, obviating the requirement for supports or direct connections to a build plate. Therefore, because there is no need to remove beams, members, or ligaments because of length, aspect ratio, or overhang angle requirements, lattice structures can take any form and have a much wider range of geometries than are possible when provided by prior art printing methods.

The binder jet process 10 also allows for printing with different powdered materials, including metals and non-metals like plastic. It works with standard metal powders common in the metal injection molding (MIM) industry, which has well-established and readily available powder supply chains in place, so the metal powder used in the binder jet process 10 is generally much less expensive than the powders used in the DMLS, DMLM, and EBAM directed energy modalities. The improved design freedom, lower cost and faster throughput of binder jet makes it suitable for individually customized club heads, prototypes, and larger scale mass-produced designs for the general public.

Lattice Structures

The binder jet process described above allows for the creation of lattice structures, including those with beams that would otherwise violate the standard overhang angle limitation set by DMLM, DMLS, and EBAM. It can also be used to create triply periodic minimal surfaces (TPMS) and non-periodic or non-ordered collections of beams.

Compressing or otherwise reducing the size of cells in a section of the lattice increases the effective density and stiffness in those regions. Conversely, expanding the size of the cells is an effective way to intentionally design in a reduction of effective density and stiffness. Effective density is defined as the density of a unit of volume in which a fully dense material may be combined with geometrically designed-in voids, which can be filled with air or another material, and/or with another or other fully dense materials. The unit volume can be defined using a geometrically functional space, such as the lattice cell shown in FIGS. 22-23 or a three dimensional shape fitted to a typical section, and in particular the volume of a sphere with a diameter that is three to five times the equivalent diameter of the nearest beam or collection of beams. The binder jet process allows for the creation of a structure with a uniform final material density of at least 90%, which contrasts with previous uses of DMLM, DMLS, and EBAM to change the actual material density by purposely creating unstructured porosity in parts.

Figure 22:
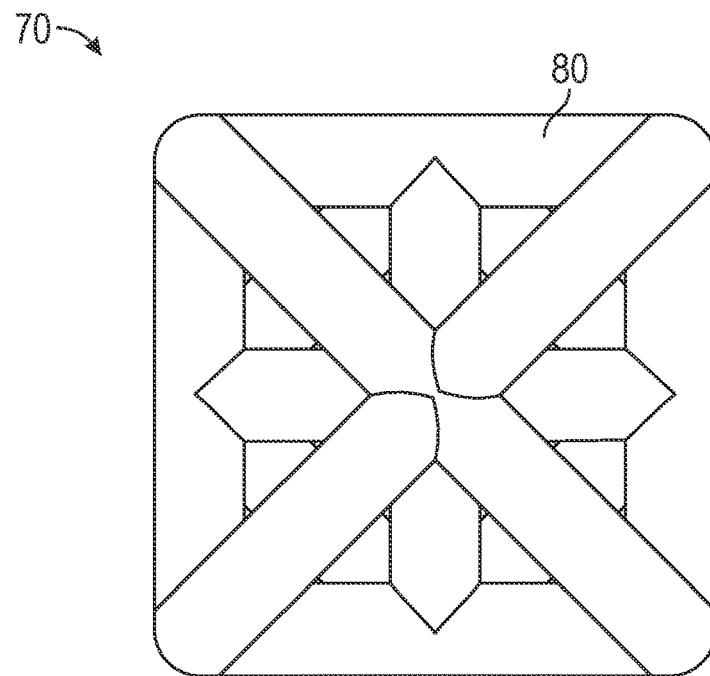
FIG. 22 is a top plan view of a unit cell of a lattice.
Figure 23:
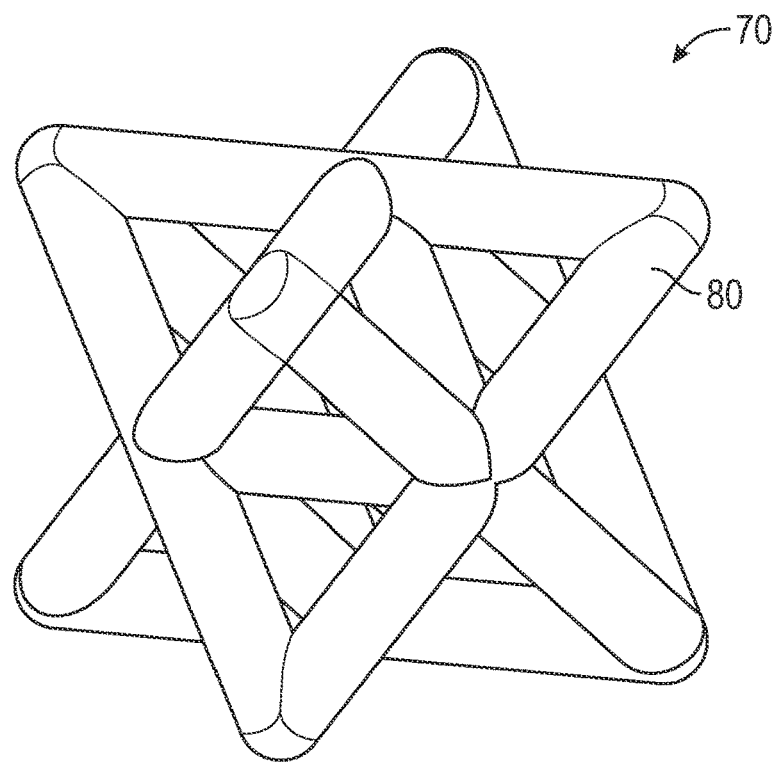
FIG. 23 is a side perspective view of the unit cell shown in FIG. 22.

Examples of lattice structures 60 that can be created using the process 10 described above are shown in FIGS. 3-21, and include warped, twisted, distorted, curved, and stretched lattices that can optimize the structure for any given application. Individual lattice cells 70 are shown in FIGS. 22-23, and may be used in addition to or instead of more complex lattice structures 60. FIGS. 5, 6, 9-10, 12, 16, 20 and 21 illustrate what the more complicated structures look like when a 40 degree overhang limitation is applied: a significant portion of the structure is lost. Another benefit of not having an overhang angle limitation is that manufacturers can create less ordered or non-ordered collections of beams. The lattice structures 60 shown herein may have repeating cells 70 or cells with gradual and/or continuously changing size, aspect ratio, skew, and beam diameter. The change rate between adjacent cells 70 and beams 80 may be 10%, 25%, 50%, and up to 100%, and this change pattern may apply to all or only some of the volume occupied by the lattice structure.

Figure 14:
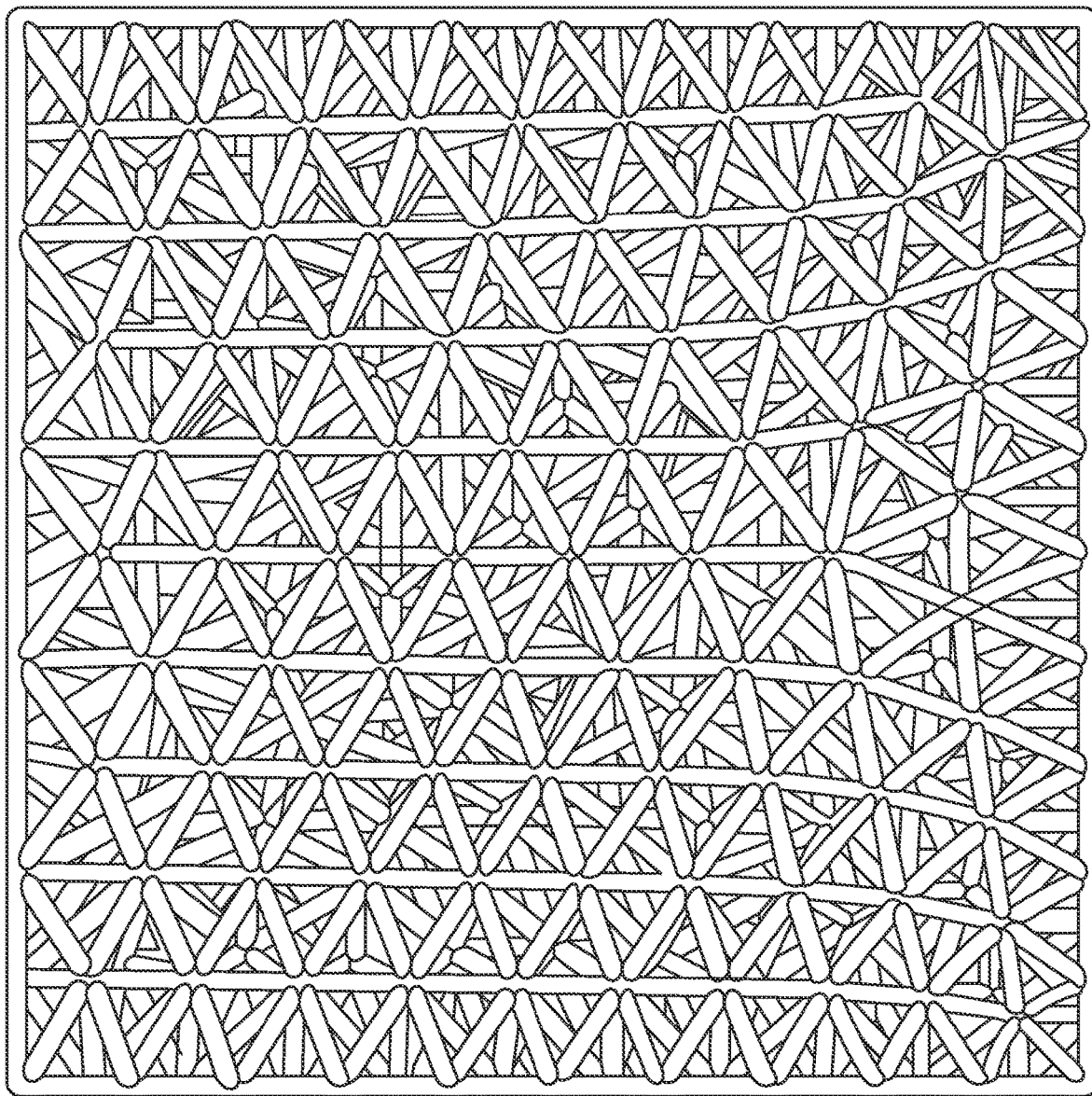
FIG. 14 is a top plan view of a non-ordered collection of beams and tetrahedral cell lattice pattern.
Figure 15:
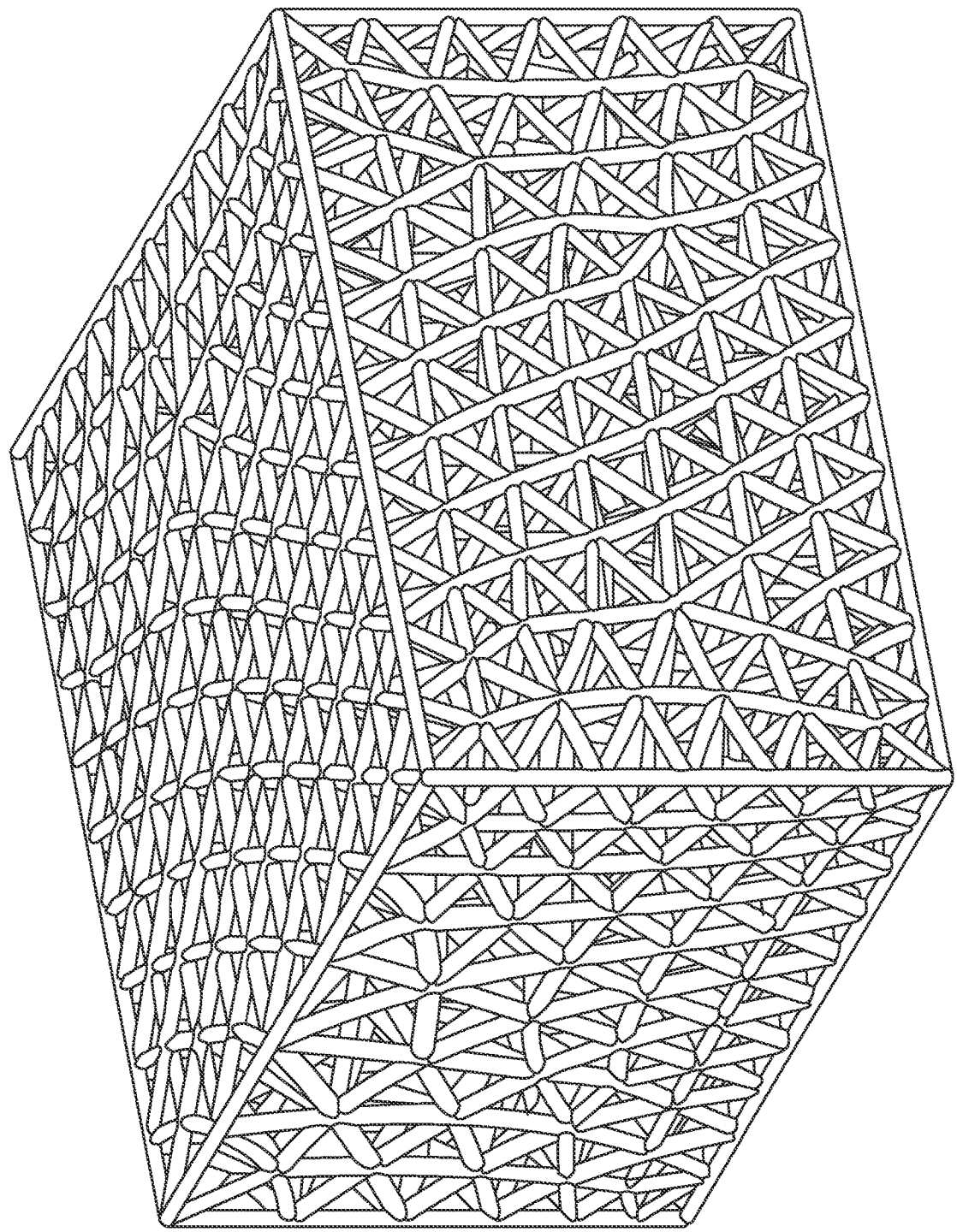
FIG. 15 is a side perspective view of the lattice pattern shown in FIG. 14.
Figure 16:
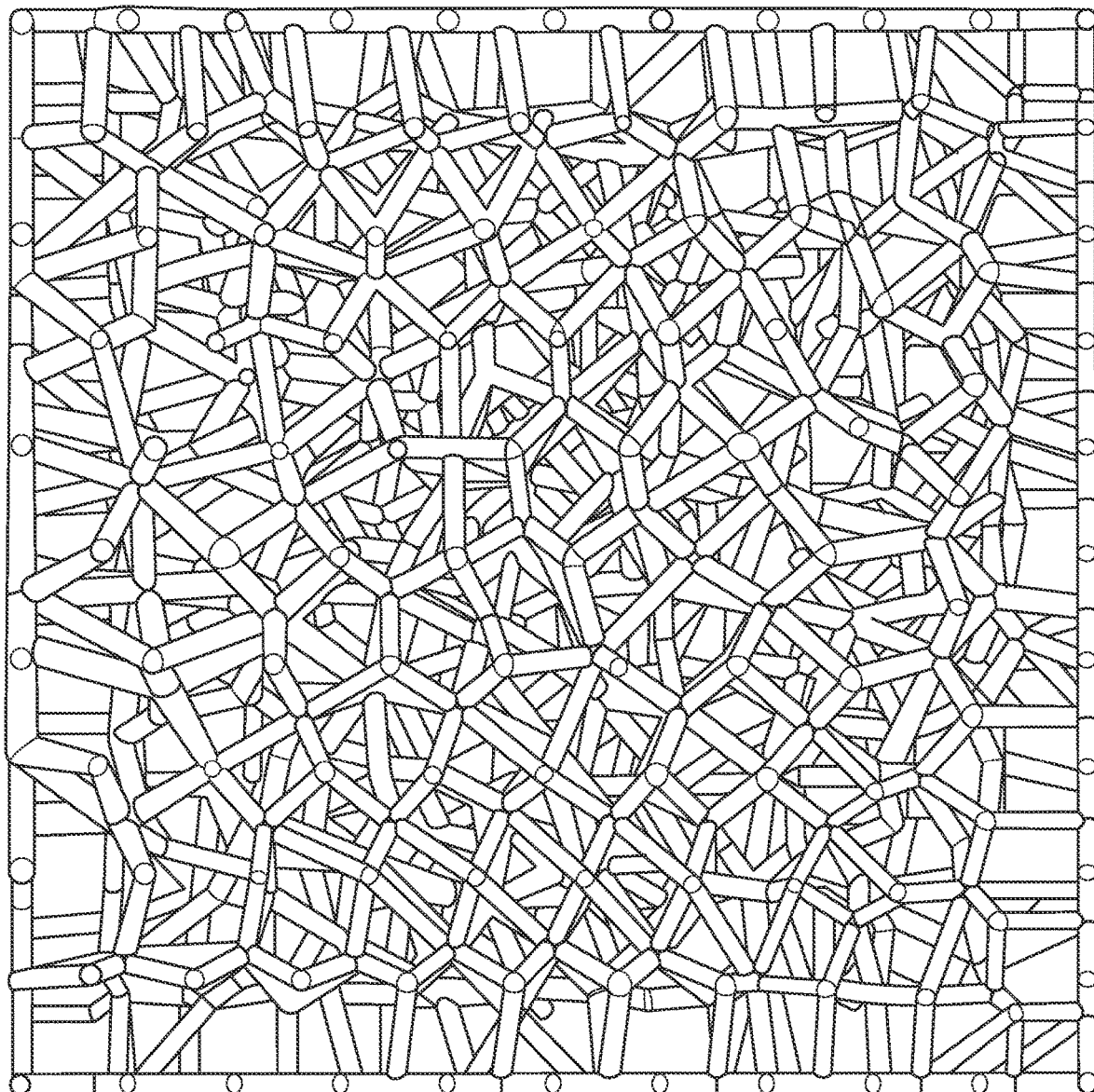
FIG. 16 is a top plan, 40° filtered from XY plane view of the lattice pattern shown in FIG. 14.
Figure 17:
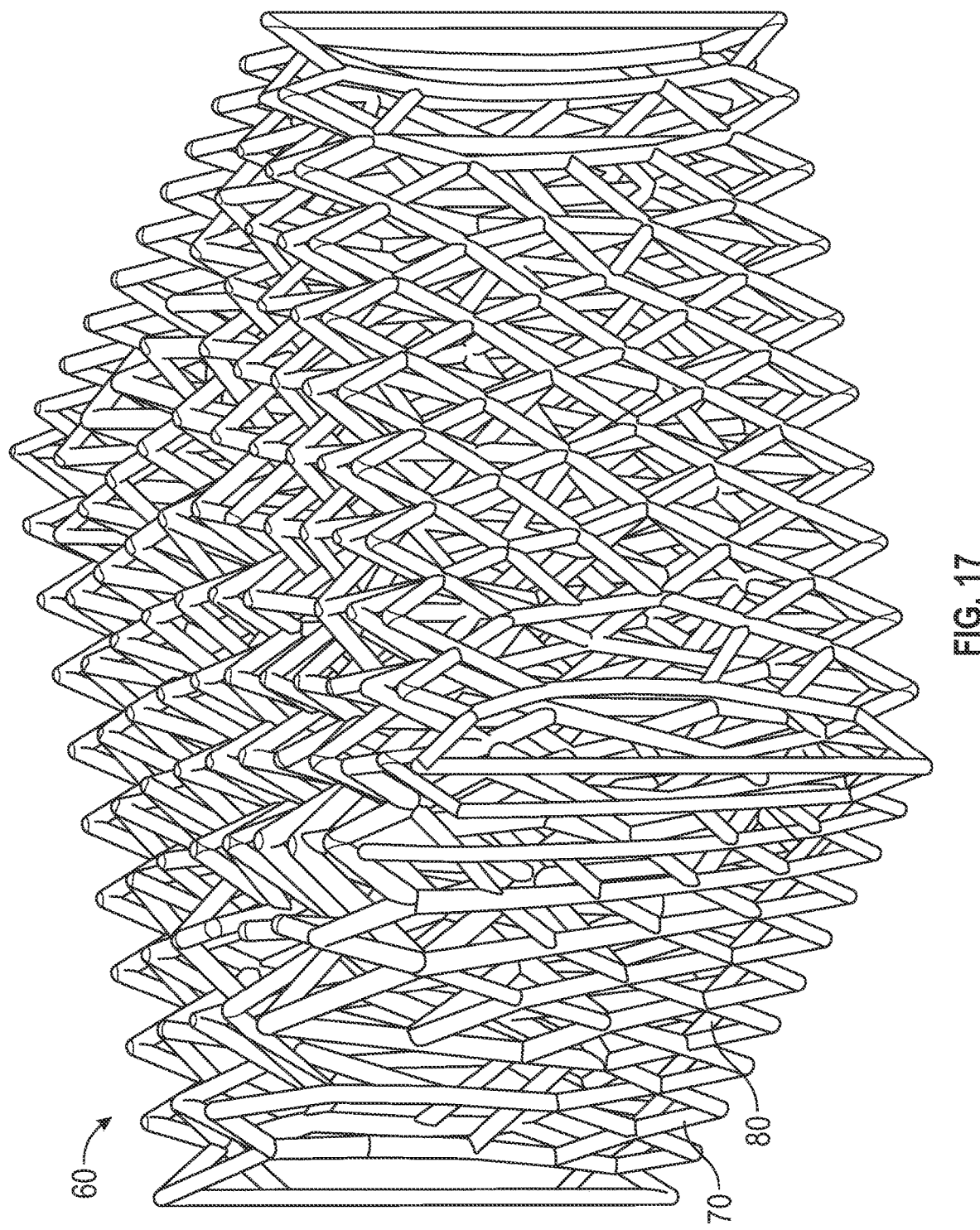
FIG. 17 is a side perspective view of the lattice pattern shown in FIG. 16.
Figure 18:
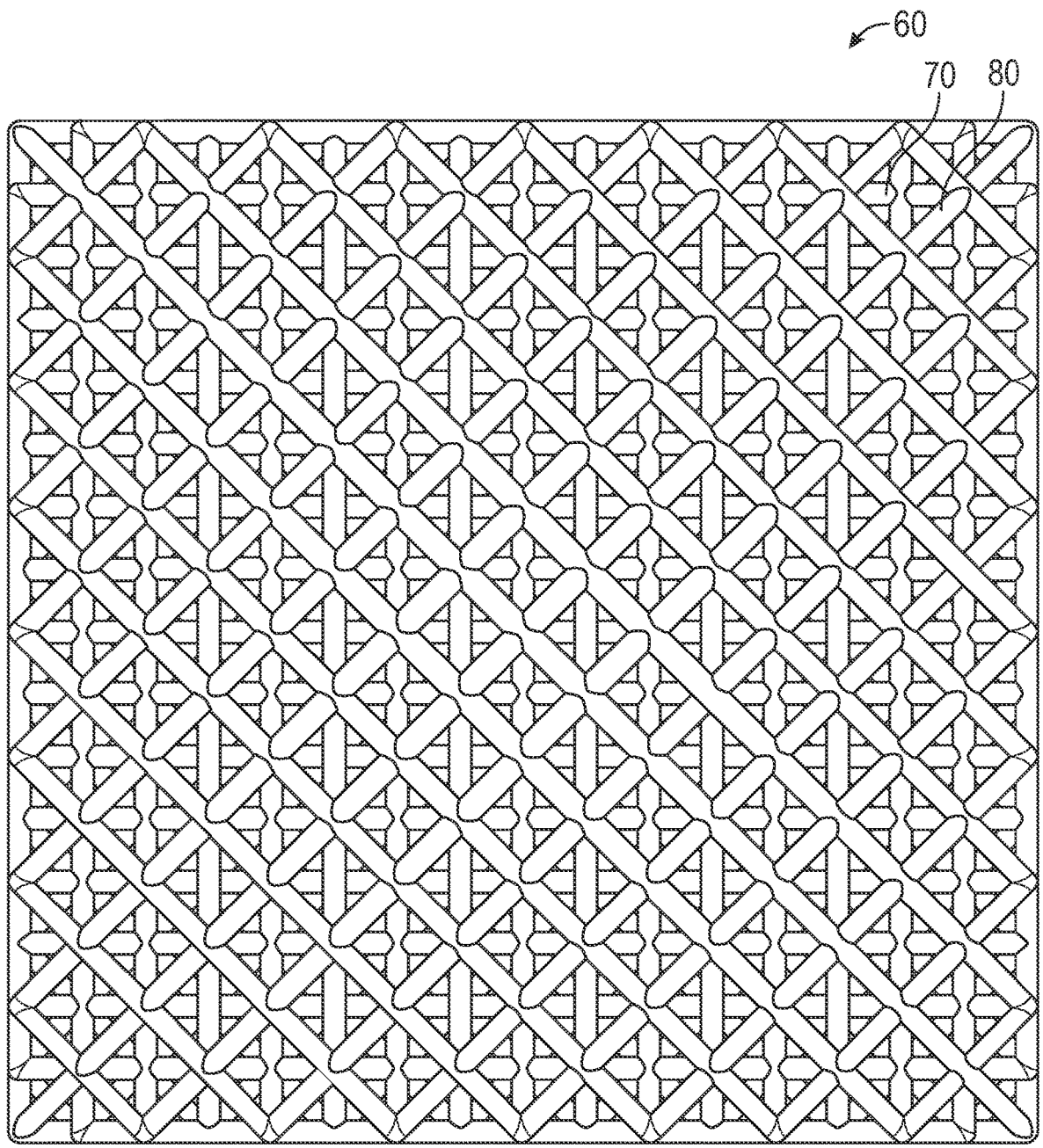
FIG. 18 is top plan view of a conformal, spherical top lattice pattern.
Figure 19:
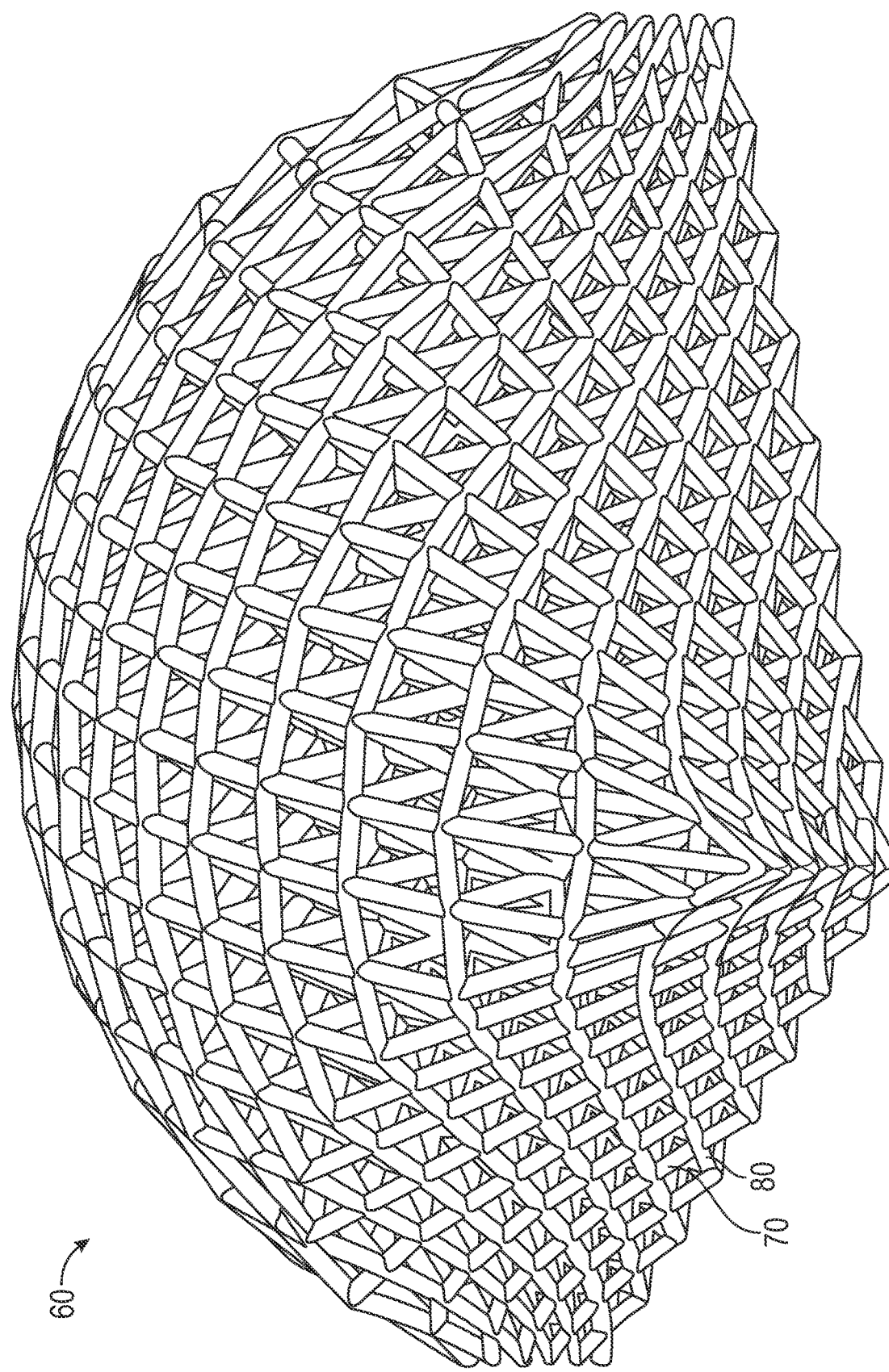
FIG. 19 is a side perspective view of the lattice pattern shown in FIG. 18.
Figure 20:
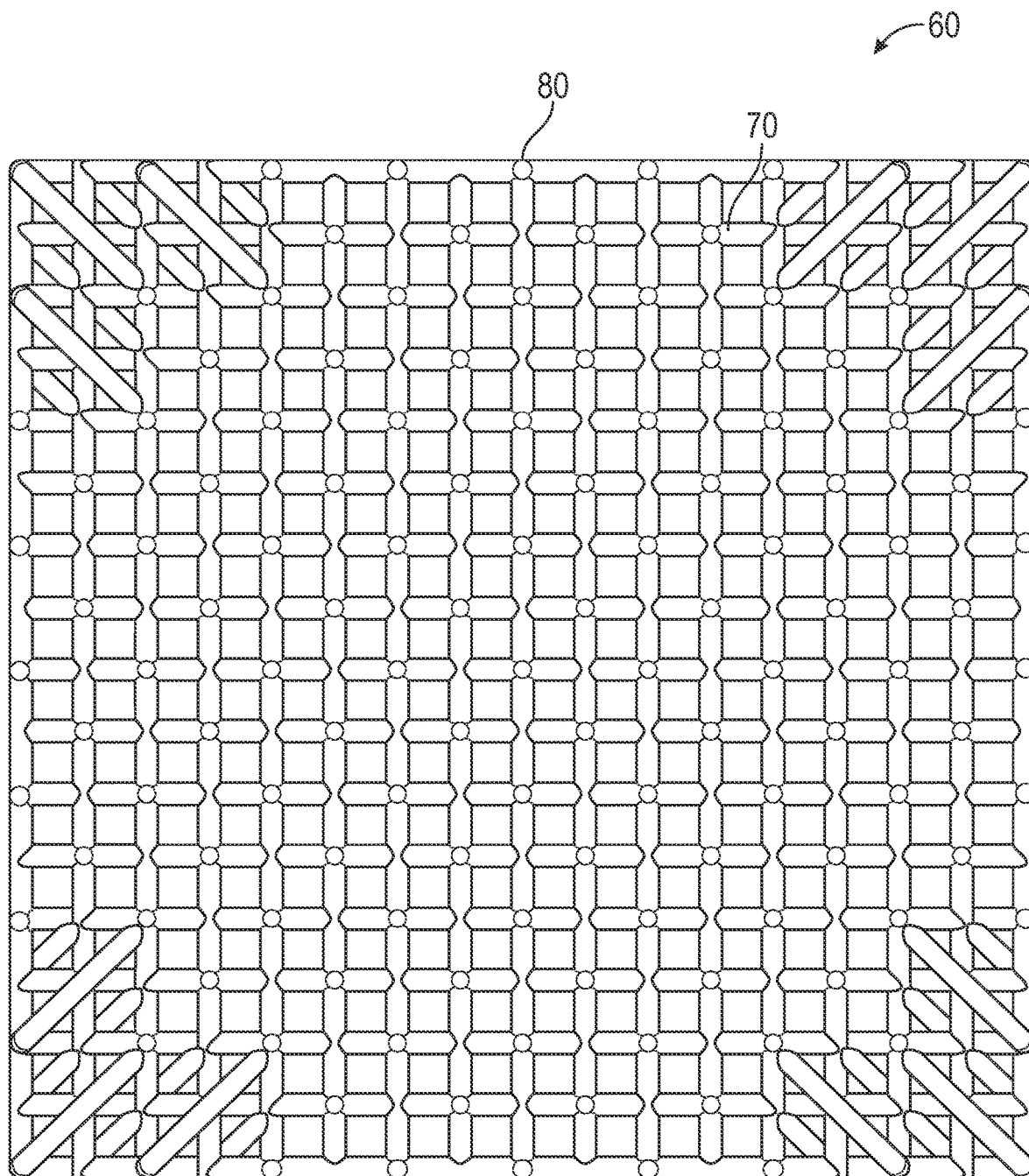
FIG. 20 is a top plan, 40° filtered from XY plane view of the lattice pattern shown in FIG. 18.
Figure 21:
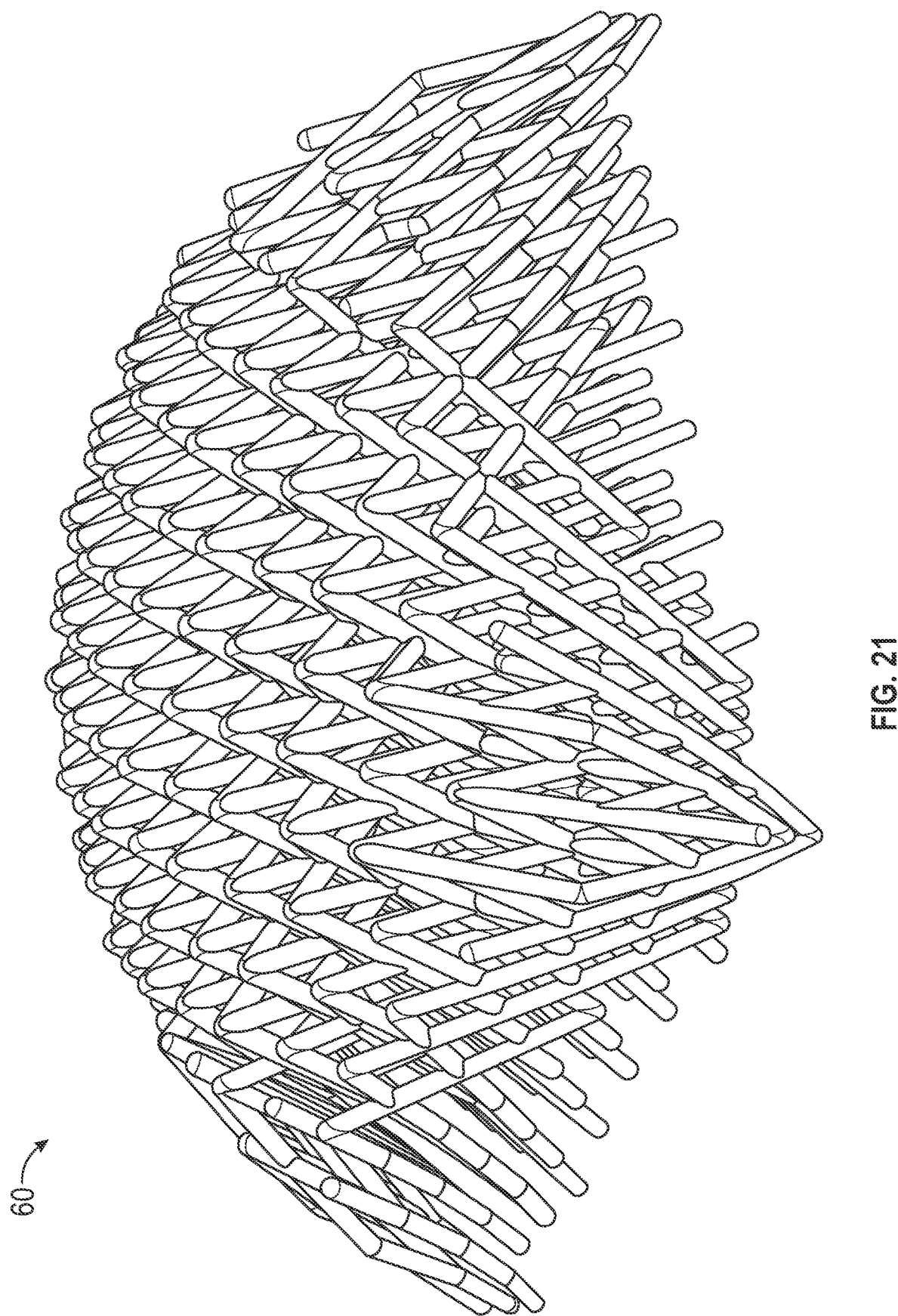
FIG. 21 is a side perspective view of the lattice pattern shown in FIG. 20.

Cell 70 type can change abruptly if different regions of a component need different effective material properties, but size, aspect ratio, skew, beam diameter can then change continuously as distance from the cell type boundary increases. The diameter of the beams 80 may be constant or tapered, and while their cross sections are typically circular, they can also be elliptical like the structural members disclosed in U.S. Pat. No. 10,835,789, the disclosure of which is hereby incorporated by reference in its entirety herein. Such structures may take the form of a series of connected tetrahedral cells 70, as shown in FIGS. 14-15. The lack of an overhang constraint allows for the beams 80 to be oriented in any fashion and therefor allows for the generation of a conformal lattice of virtually any size and shape. Modern meshing software also provide quick and simple method by which to fill volumes and vary the lattice density via non-ordered tetrahedral cells. Tetrahedral cells 70 are also very useful for varying cell size and shape throughout a part.

Lattice Applications in Golf Club Heads

Figure 28:
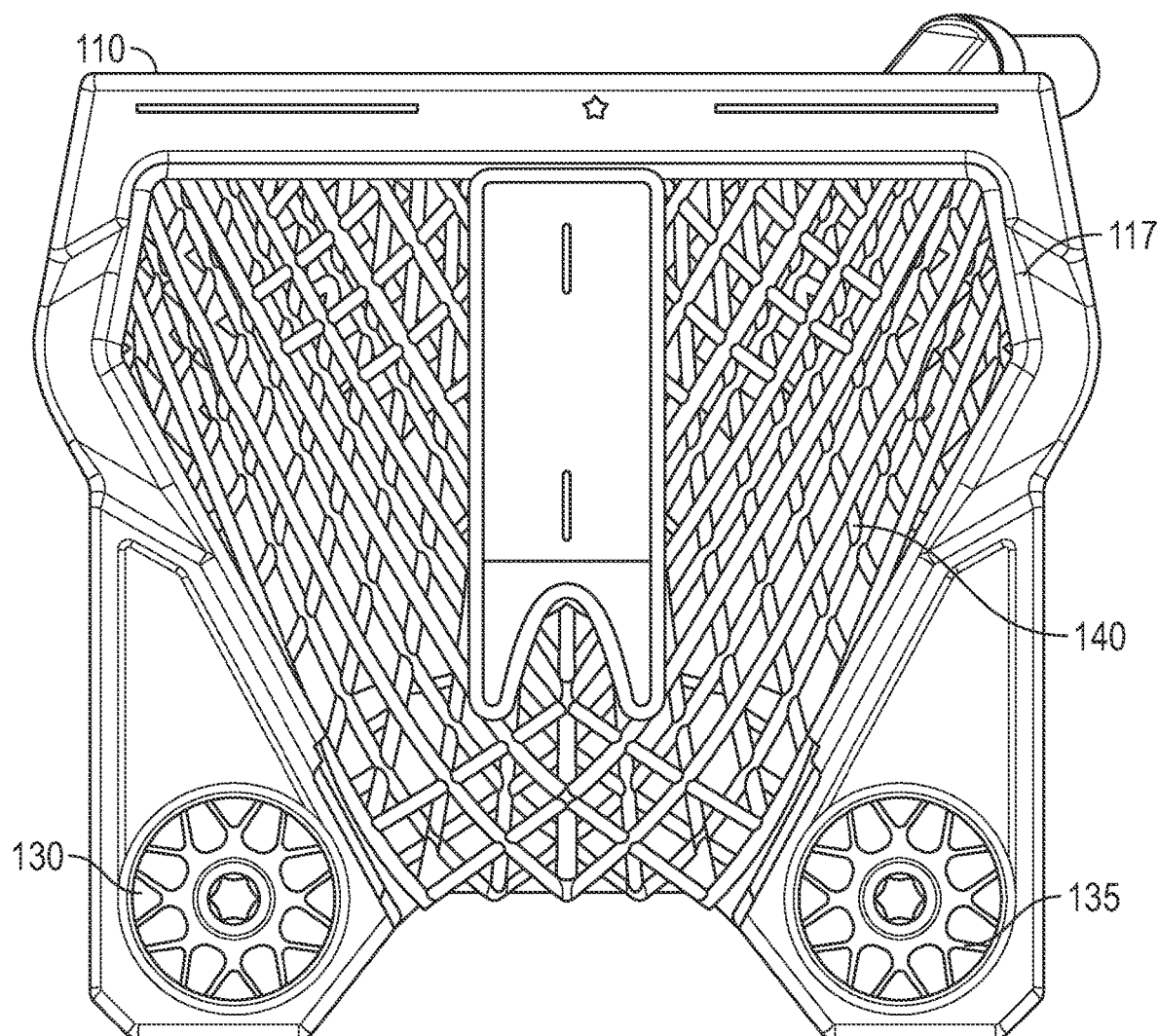
FIG. 28 is a sole plan view of another embodiment of a putter head with a sole puck formed from a lattice.
Figure 29:
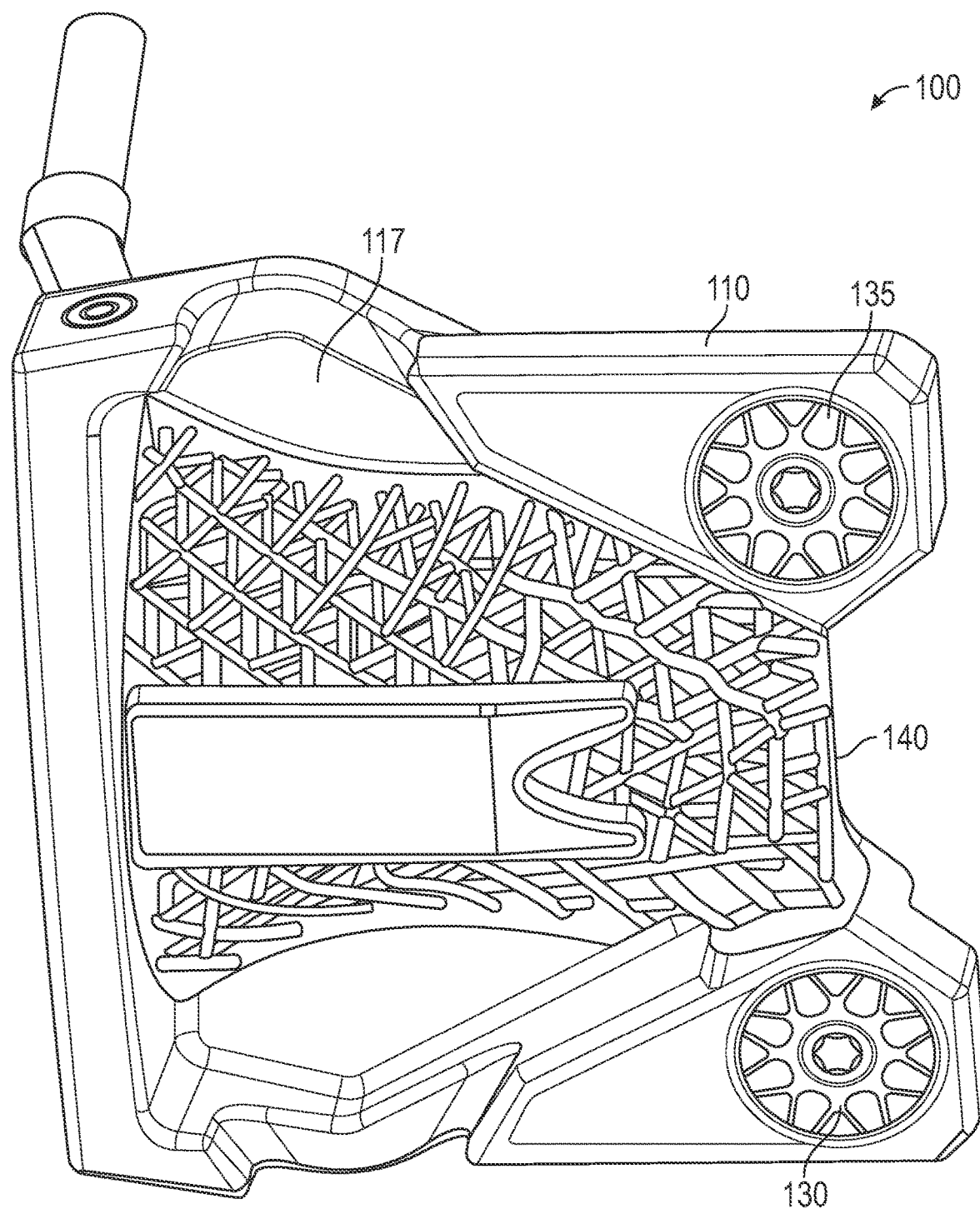
FIG. 29 is a sole perspective view of another embodiment of a putter head with a sole puck formed from a lattice.
Figure 30:
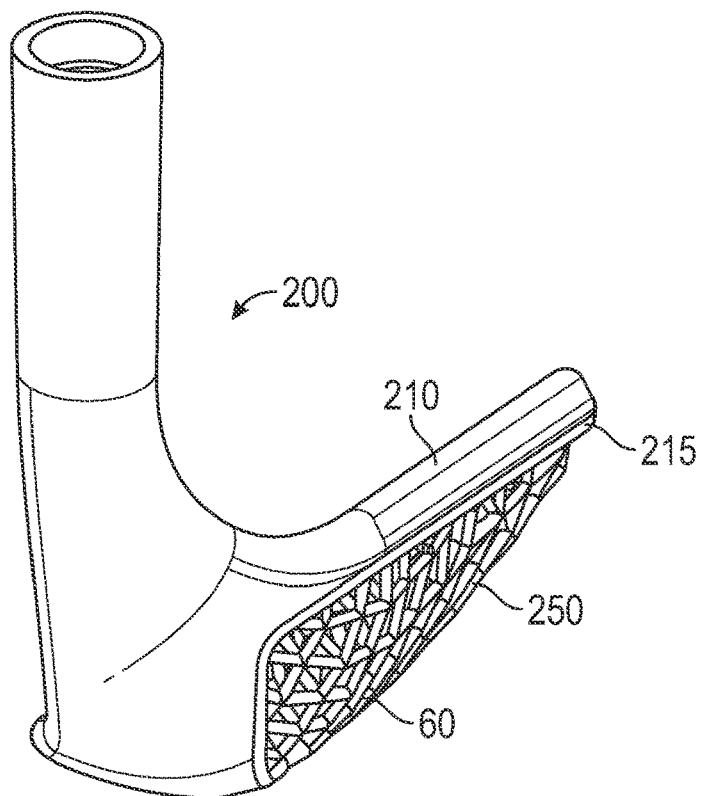
FIG. 30 is a side perspective view of an iron head with a rear insert formed from a lattice.
Figure 31:
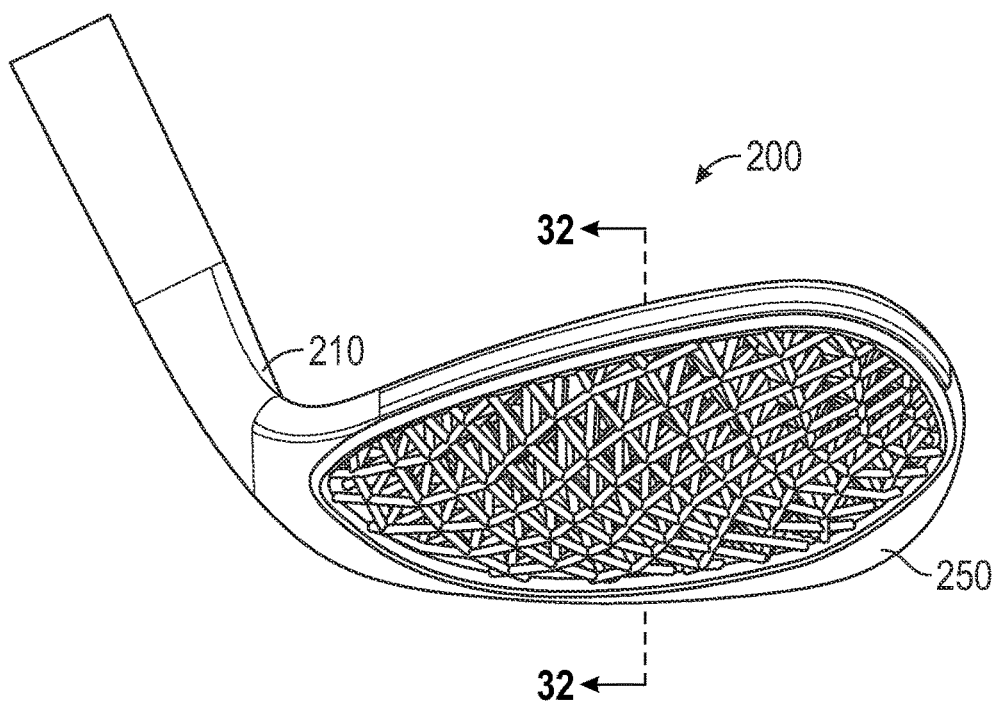
FIG. 31 is a rear perspective view of the iron head shown in FIG. 30.
Figure 32:
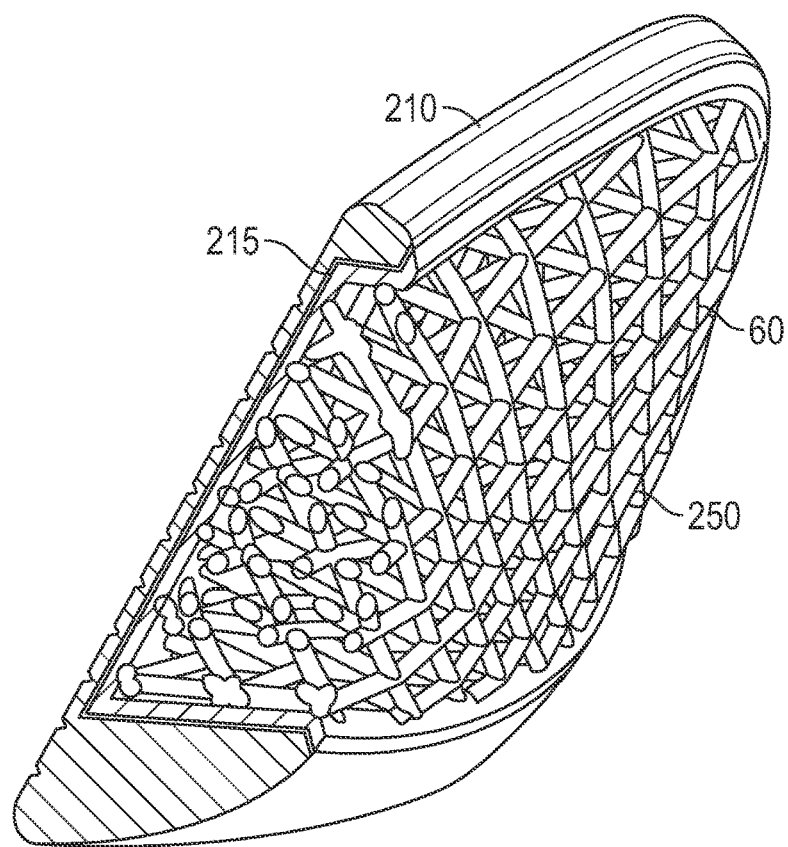
FIG. 32 is a cross-sectional view of the iron head shown in FIG. 31 taken along lines 32-32.
Figure 33:
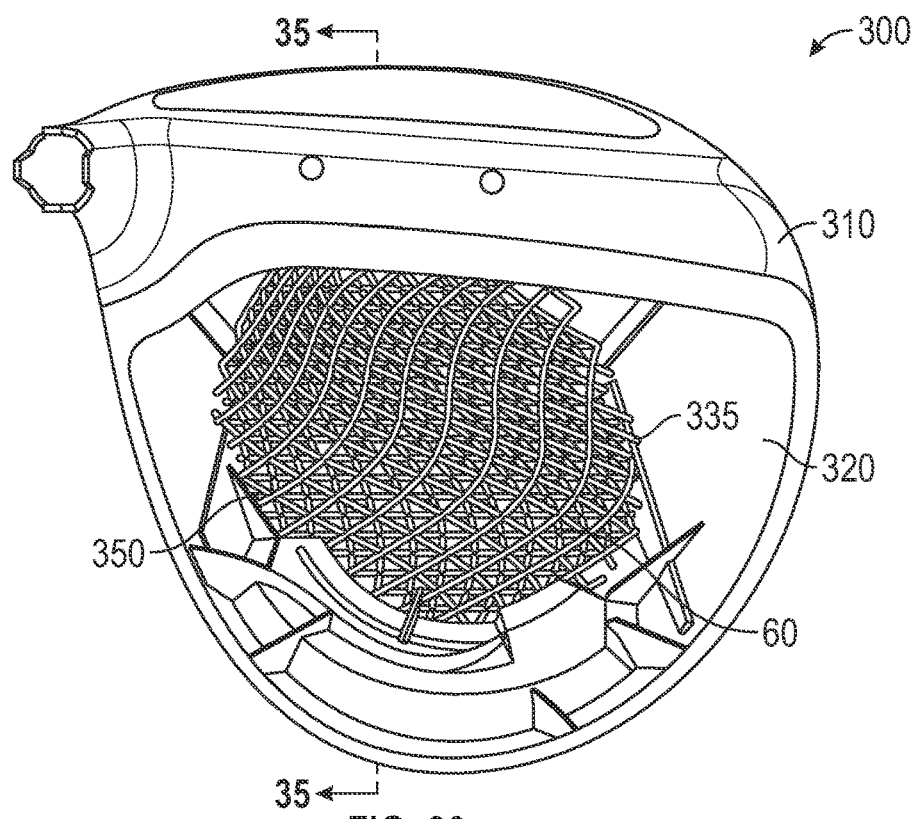
FIG. 33 is a top elevational view of a driver head with a lattice insert.
Figure 34:
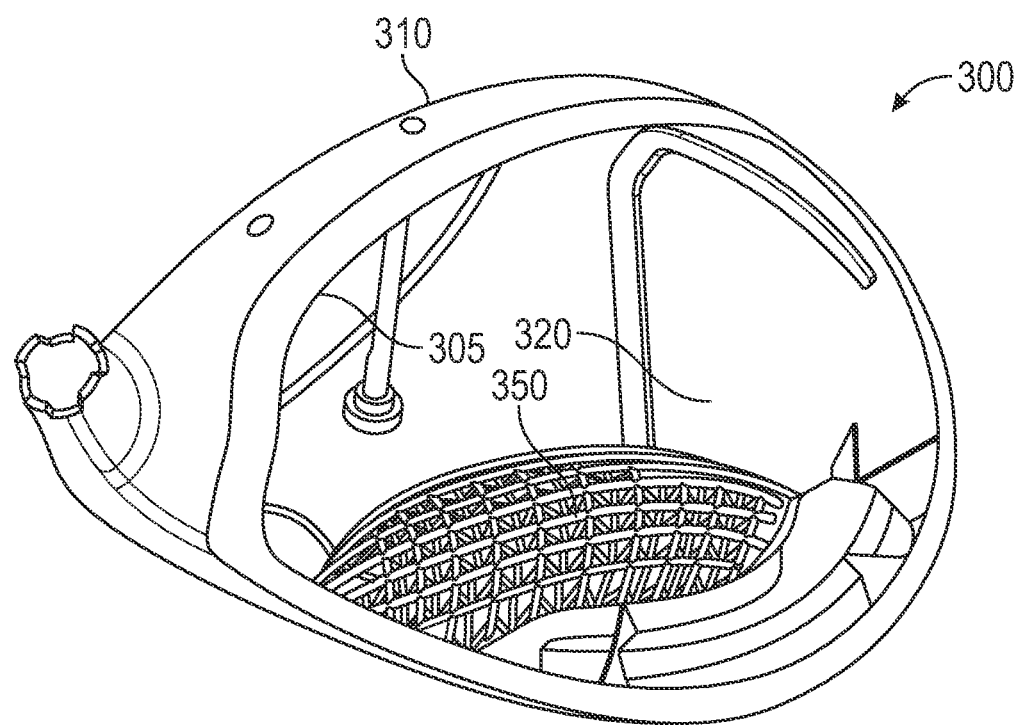
FIG. 34 is a side perspective view of the driver head shown in FIG. 33.
Figure 35:
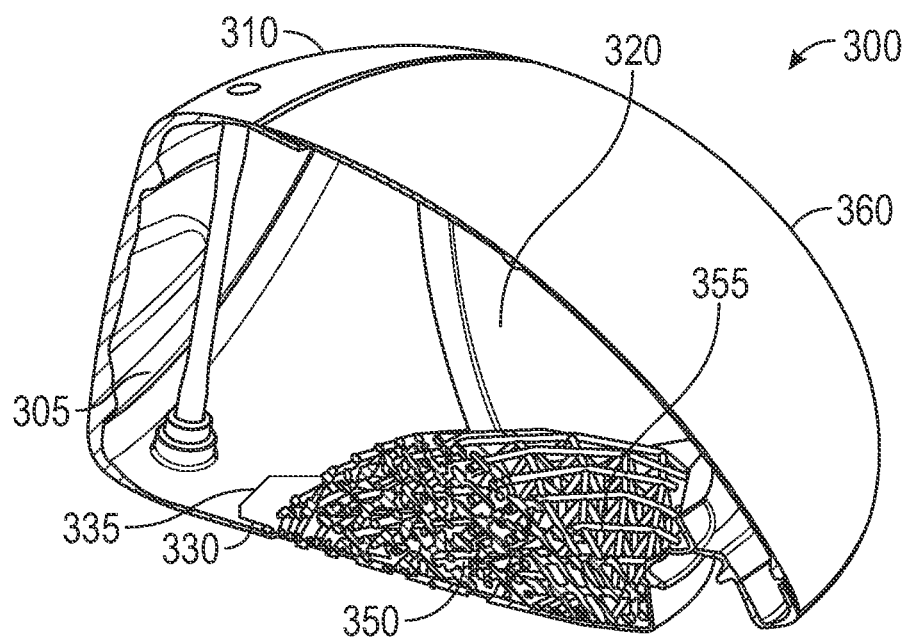
FIG. 35 is a cross-sectional view of the driver head shown in FIG. 33 taken along lines 35-35.
Figure 37:
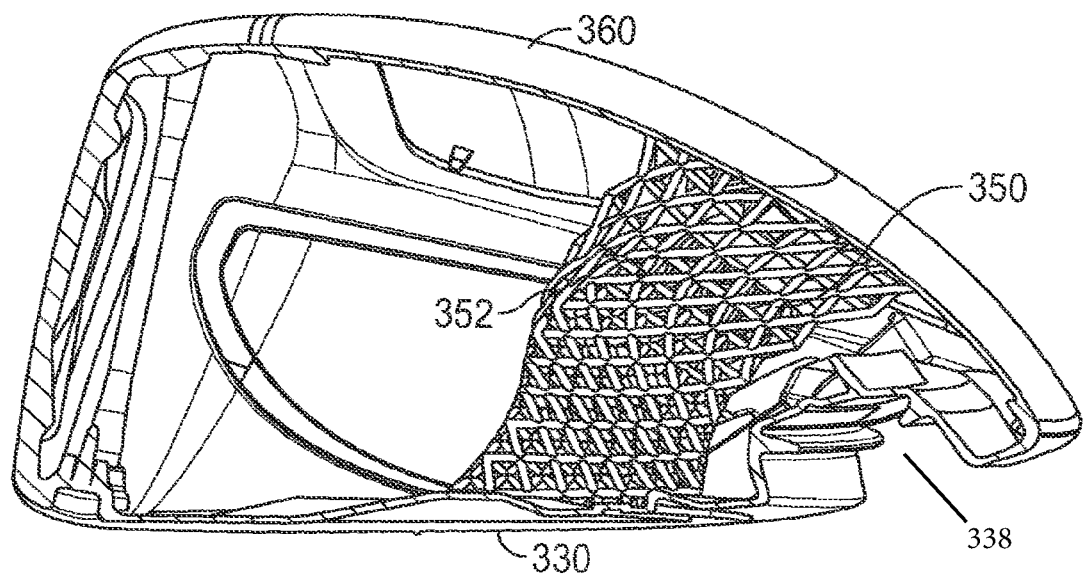
FIG. 37 is a side plan view of the embodiment shown in FIG. 36.
Figure 38:
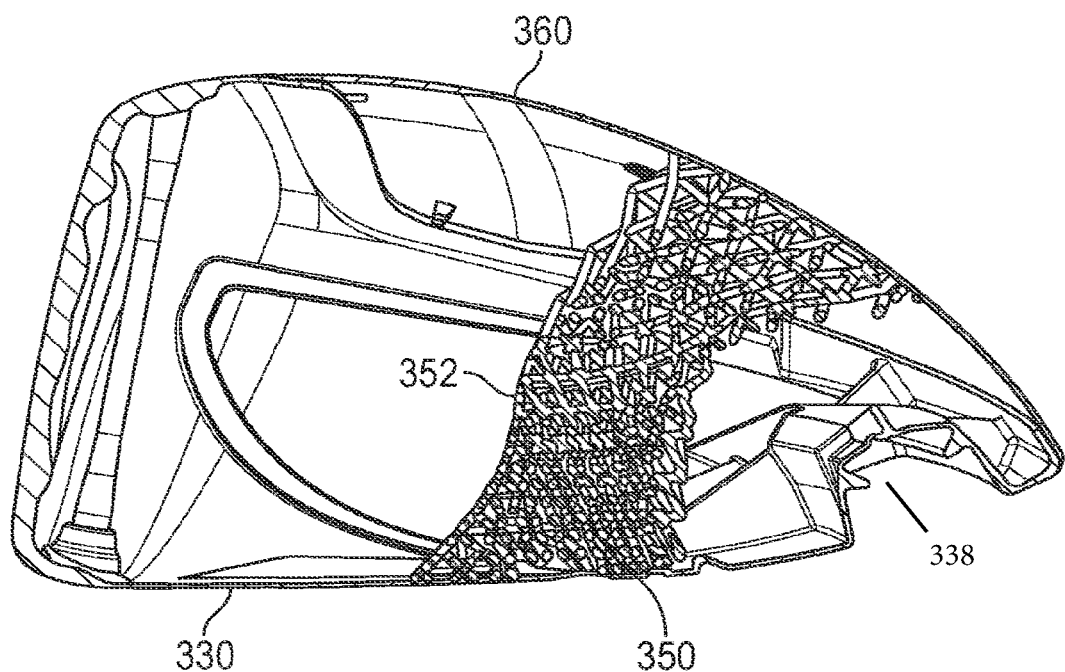
FIG. 38 is a cross-sectional view of the embodiment shown in FIG. 36.
Figure 39:
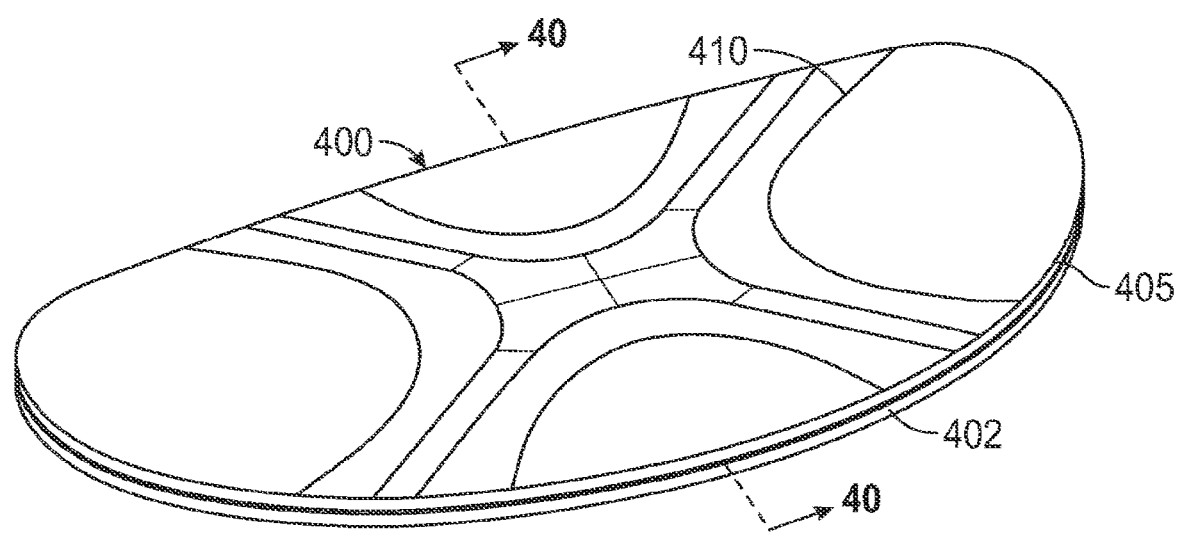
FIG. 39 is a rear perspective view of a face insert comprising a lattice.
Figure 40:
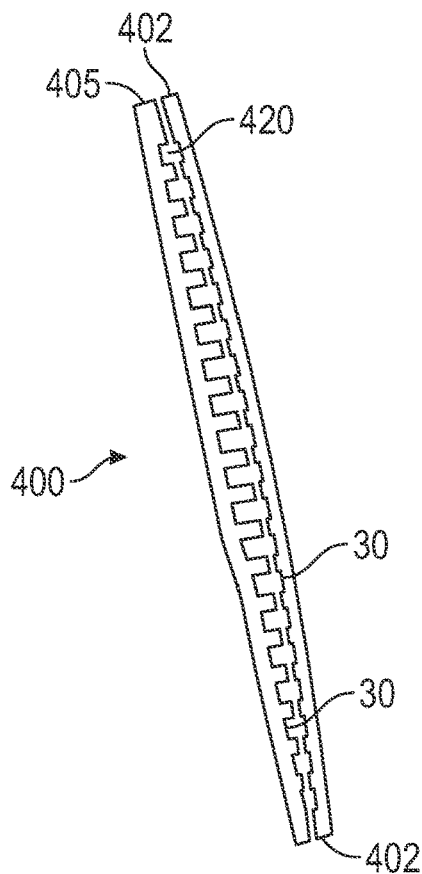
FIG. 40 is a cross-sectional view of the face insert shown in FIG. 39 taken along lines 40-40.
Figure 41:
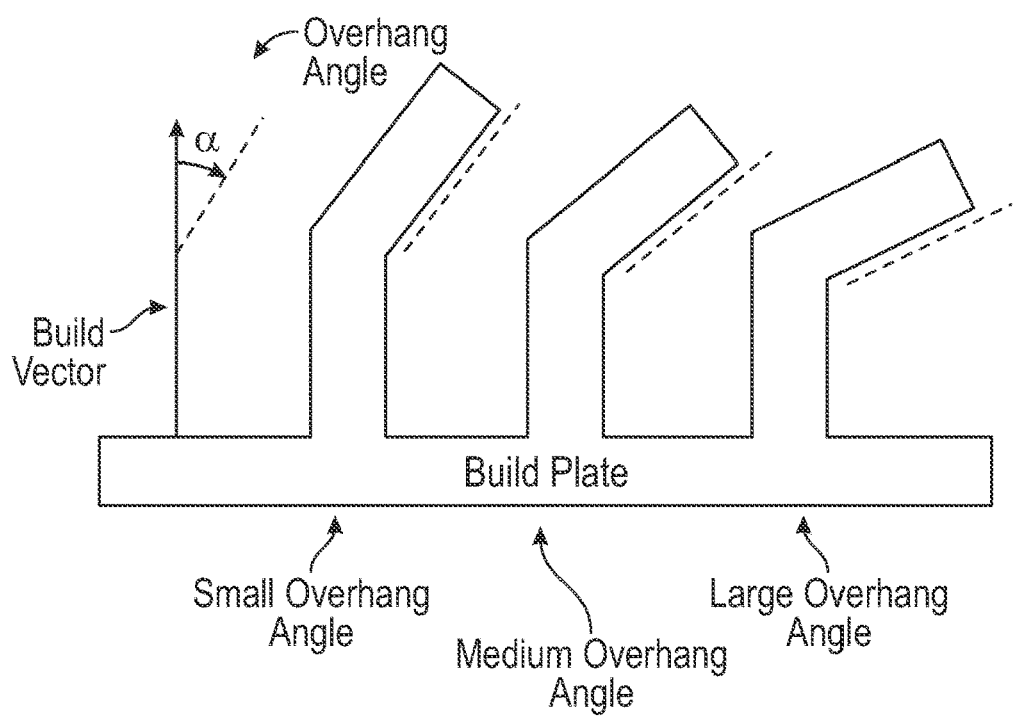
FIG. 41 is a drawing of a build plate with beams having different overhang angles.

The binder jet process 10 permits manufacturers to take full advantage of generative design and topology optimization results, examples of which are shown in the context of putter heads 100 in FIGS. 24-29, an iron-type golf club head 200 in FIGS. 30-32, driver-type golf club heads 300 in FIGS. 33-38, and a face insert 400 with a variable thickness pattern 410 in FIGS. 39 and 40. The lattice structures 60 disclosed herein can be built into their respective golf club heads in one 3D printing step, or may be formed separately from the golf club head and then permanently affixed to the golf club head at a later time. These designs illustrate the kinds of improvements to golf club head center of gravity (CG), moment of inertia (MOI), stress, acoustics (e.g., modal frequencies), ball speed, launch angle, spin rates, forgiveness, and robustness that can be made when manufacturing constraints are removed via the use of optimization software and 3D printing.

Figure 24:
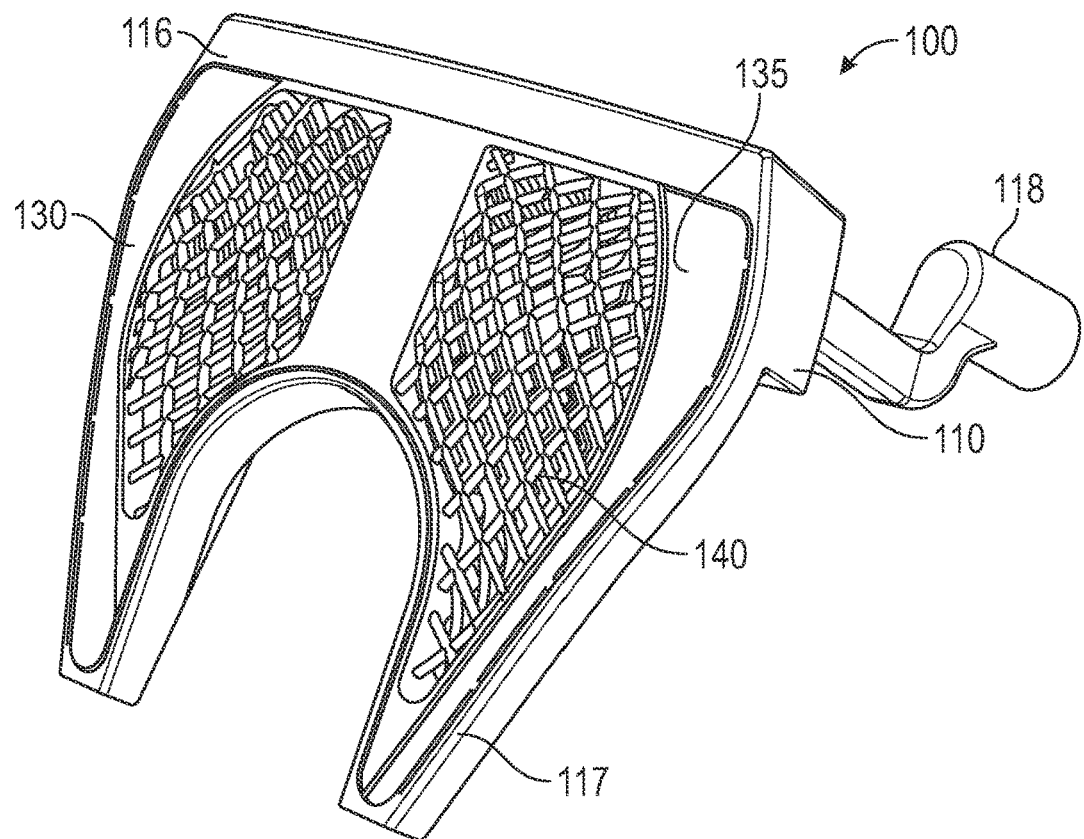
FIG. 24 is a sole perspective view of a putter head with a sole puck formed from a lattice.
Figure 25:
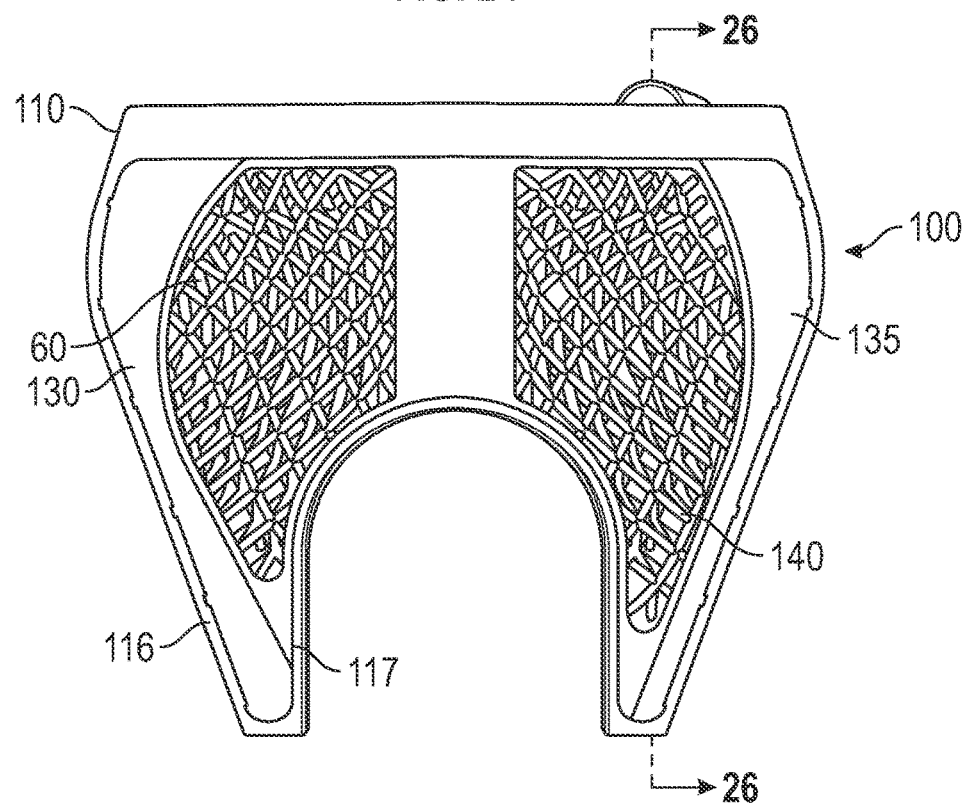
FIG. 25 is a sole plan view of the putter head shown in FIG. 24.
Figure 26:
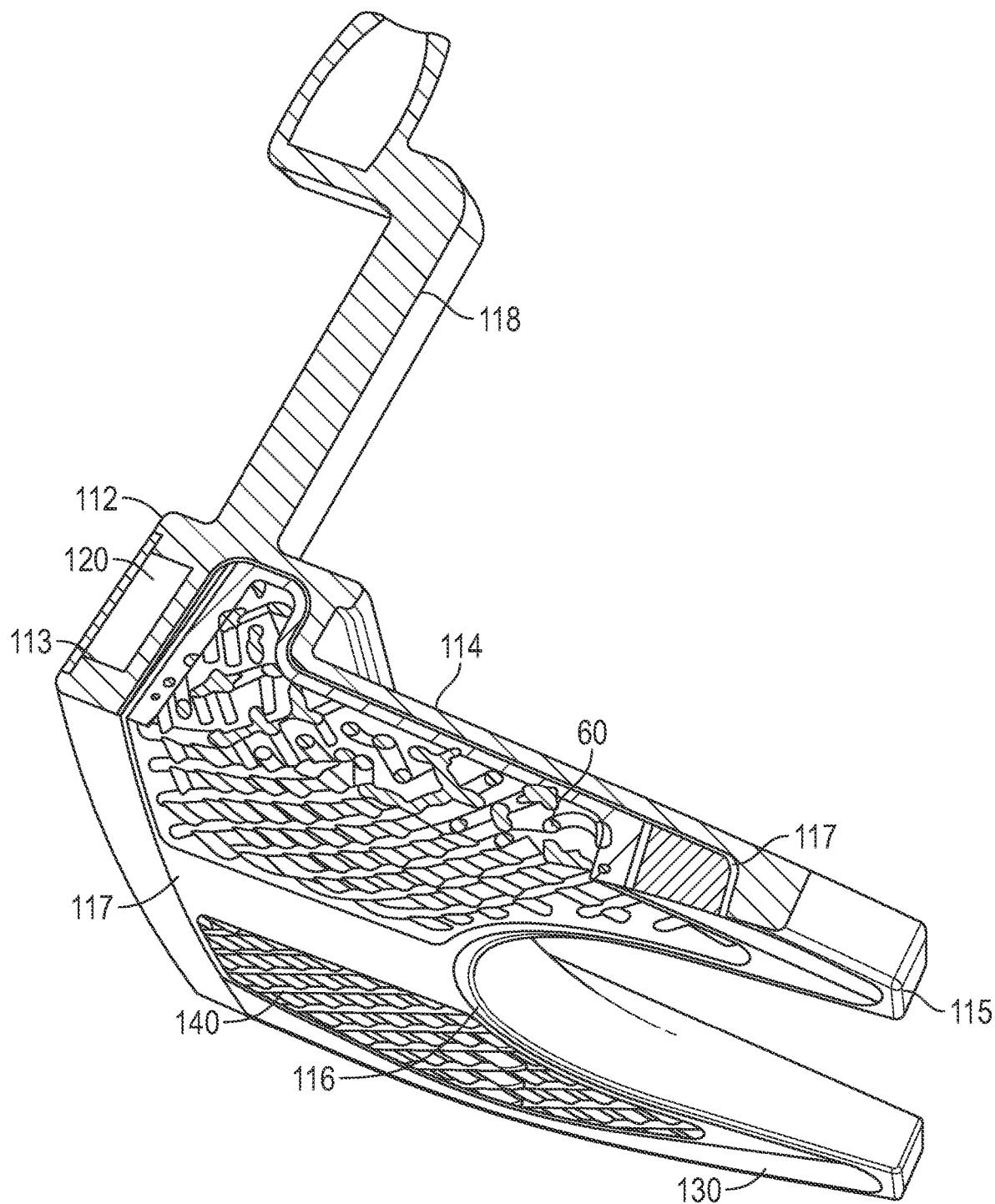
FIG. 26 is a cross-sectional view of the putter head shown in FIG. 25 taken along lines 26-26.

A preferred embodiment of the present invention is shown in FIGS. 23-25. The putter head 100 of this embodiment includes a body 110 with a face portion 112 and a face recess 113, a top portion 114, and a sole portion 116 with a sole recess 117, a face insert 120 disposed within the face recess 113, and sole weights 130, 135 and a sole insert or puck 140 affixed within the sole recess 117 so that the weights 130, 135 are disposed on heel and toe sides of the puck 140. The body 110 of the putter, and particularly the top portion 114, is formed of a metal alloy having a first density and has a body CG. The weights 130, 135 are preferably located as far as possible from the body CG and are composed of a metal alloy having a second density greater than the first density. While the hosel 118 of the embodiment shown in FIGS. 23-25 is formed integrally with the body 110, in other embodiments it may be formed separately from a different material and attached in a secondary step during manufacturing.

The puck 140 is printed using the binder jet process described above from at least one material with a third density that is lower than the first and second densities, and comprises one or more lattice structures 60 that fill the volume of the sole recess 117, freeing up discretionary mass to be used in high-density weighting at other locations on the putter head 100, preferably at the heel and toe edges and/or the rear edge 115. The materials from which the puck 140 may be printed include plastic, nylon, polycarbonate, polyetherimide, polyetheretherketone, and polyetherketoneketone. These materials can be reinforced with fibers such as carbon, fiberglass, Kevlar®, boron, and/or ultra-high-molecular-weight polyethylene, which may be continuous or long relative to the size of the part or the putter, or very short.

Figure 27:
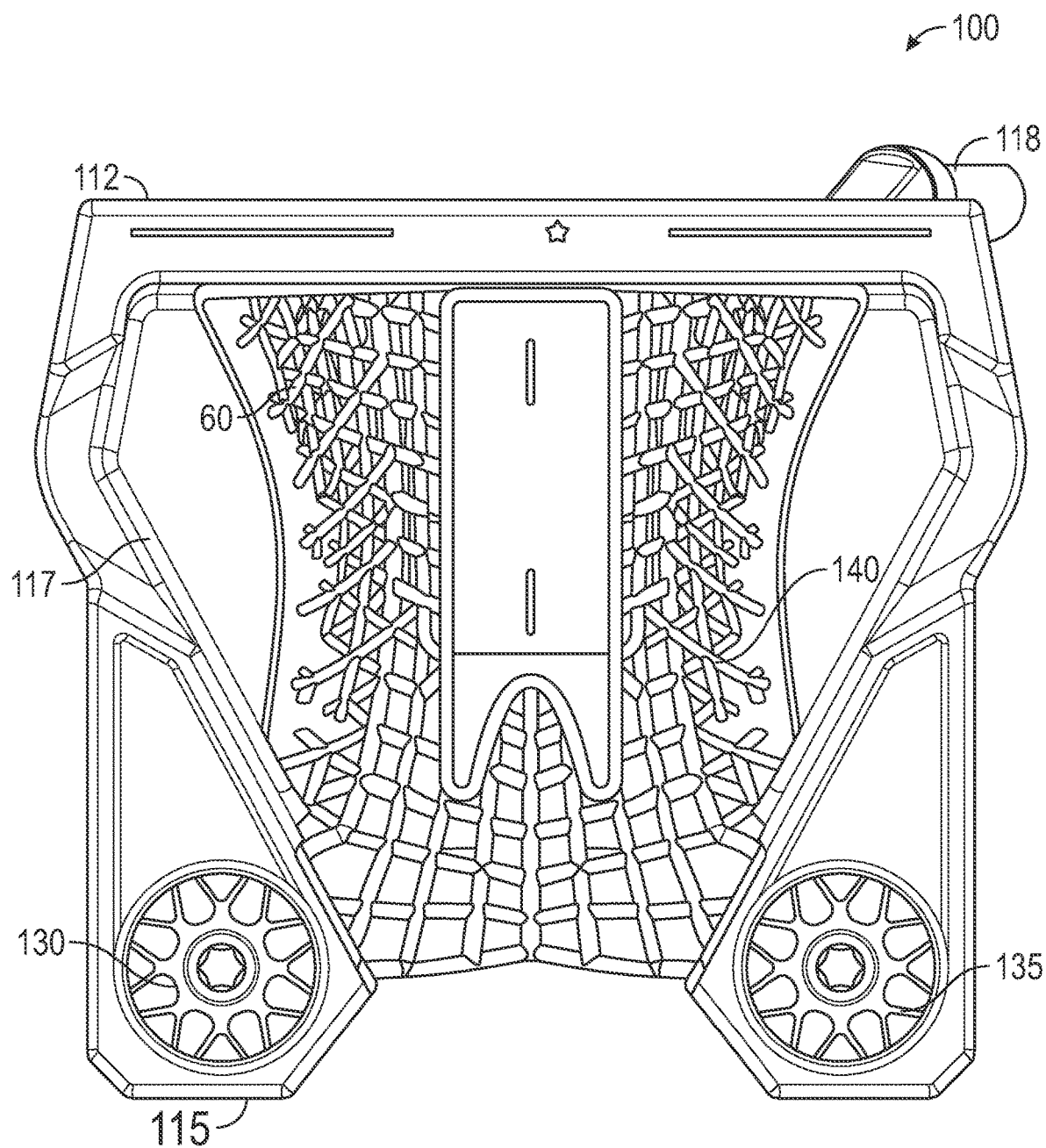
FIG. 27 is a sole plan view of another embodiment of a putter head with a sole puck formed from a lattice.

Other putter head 100 embodiments are shown in FIGS. 27-29. In these embodiments, the weights 130, 135 are threaded and are disposed at the rear edge 115 of the body, on either side and mostly behind the puck 140. In the embodiments shown in FIGS. 27 and 29, the pucks 140 have different lattice patterns 60 than the one shown in FIGS. 24-26, and do not fill the entirety of the sole recess 117. In the embodiment shown in FIG. 28, the puck 140 has another lattice pattern 60 and fills the entirety of the sole recess 117. In any of these embodiments, puck 140 may be bonded and/or mechanically fixed to the body 110. The materials, locations, and dimensions may be customized to suit particular players.

In each of these embodiments, the weights 130, 135 preferably are made of a higher density material than the body 110, though in other embodiments, they may have an equivalent density or lower density. Moving weight away from the center improves the mass properties of the putter head 100, increasing MOI and locating the CG at a point on the putter head 100 that reduces twist at impact, reduces offline misses, and improves ball speed robustness on mishits.

Figure 36:
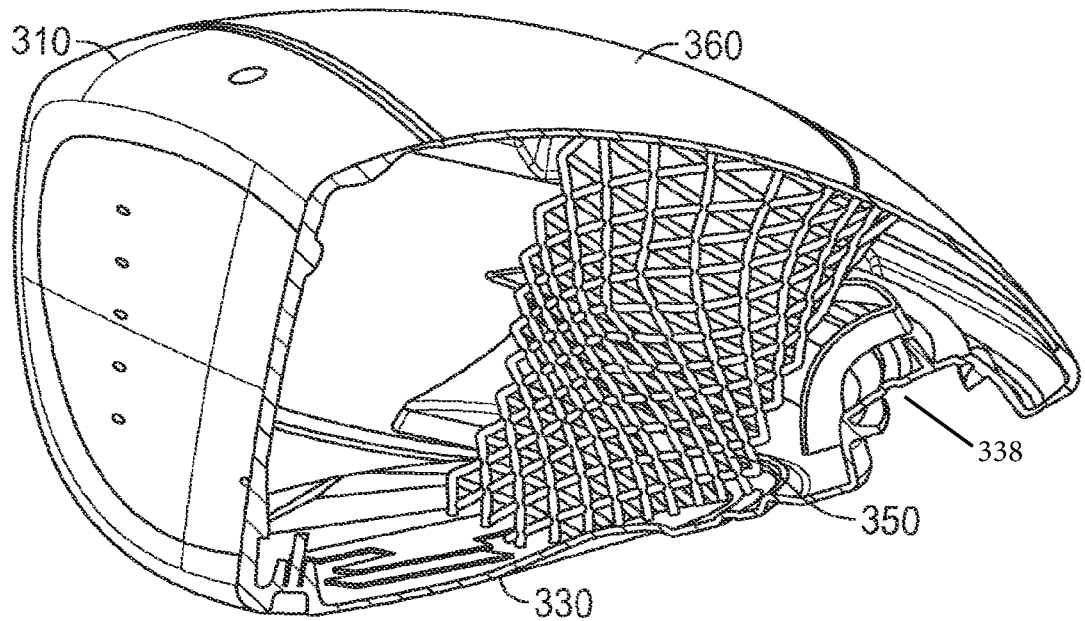
FIG. 36 is cross-sectional view of another embodiment of a driver head with a different lattice insert.

As shown in the iron club head 200 of FIGS. 30 and 31, the lattice structures 60 of the present invention can be formed into an insert 250 that entirely fills a rear cavity 215 of the iron body 210. Alternatively, as shown in the driver-type golf club heads 300 of FIGS. 33-38, the lattice insert 350 fills only a portion of the internal cavity 320. For example, in FIGS. 33-35, the lattice insert 350, which has a curved upper surface 355, contacts only an interior surface 335 of the sole 330 and is spaced from a rear face surface 305 of the body 310. As shown in FIGS. 36-38, the lattice insert 350 extends from the sole 330 to the crown insert 360 proximate a channel component 338, and has at least one curved surface 352.

Excess Powder Removal

The increased design freedom provided by binder jetting allows for the creation of fully enclosed void volumes with a few, small vent holes for powder removal, which can later be plugged (if needed) via spot weld, threaded fastener, cap, cover, medallion, adhesive, or other means known to a person skilled in the art. The absence of metal support structures allows hollow structures like a typical driver head or fairway wood to be printed with only small vent holes for powder removal. Removal of powder reduces the overall mass of printed golf club head components and improves their structural integrity.

Each of the designs disclosed herein have a plurality of openings that permit removal of excess printing material. Another example of a golf club component with such holes is shown in FIGS. 39 and 40 with reference to a binder jet printed face insert 400 having a variable thickness pattern 410. This face insert 400 has a plurality of port holes 402 encircling the insert 400 along its outer edge 405, also known as the weld joint. The port holes 402 extend from the outer edge 405 and connect with central voids 420 where excess powder 30 is trapped after the sintering process is complete. The greater the surface area of the part, in this case the face insert 400, the greater number of port holes 420 are required to efficiently remove the excess powder 30.

Once excess powder 30 is removed from the face insert 400, preferably via shaking and polishing steps, the insert 400 can be welded into a golf club head 300 to ensure that the resulting final product does not violate any USGA rules against open holes. The port holes 402 preferably are placed in strategic locations on the face insert 400 or other parts of the golf club heads such that they fall within a weld zone, a bonding zone, under a medallion, and/or in a brazing zone. In other words, the port holes 402 are located in a region on the part where a secondary process will cover them up. This allows for the excess powder 30 to be evacuated in the raw state, and then for the port hole 402 to be covered once the raw part is made into a golf club head 300.

Entire heads, or head components, can be printed and assembled using the methods disclosed herein from materials such as steel, titanium, carbon fiber composites, and other structural materials. If golf club components are printed as disclosed herein, they can be attached to traditionally manufactured components via welding, bonding, brazing, soldering, and/or other techniques known in the art. The methods of the present invention are applicable to any type of club head, including putters, wedges, irons, hybrids, fairway woods, and drivers.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A driver-type golf club head comprising:
a metal body comprising a front wall, a sole, a front opening in the front wall and an external surface;
a metal face component affixed to the body to close the front opening;
a crown insert;
a component comprising a channel;
a lattice structure comprising a plurality of voids; and
a plurality of port holes extending into the external surface,
wherein at least of one of the plurality of port holes communicates with at least one of the plurality of voids, and
wherein the lattice structure is at least partially bounded by the external surface of the metal body and fills only a portion of an internal cavity of the driver-type golf club head and is proximate the channel;
wherein the lattice structure comprises a uniform final material density of at least 90%,
wherein the lattice structure comprises a plurality of non-ordered beams,
wherein each of the plurality of non-ordered beams has a cross sectional shape selected from the group consisting of circular and elliptical,
wherein each of the plurality of non-ordered beams has a tapered diameter,
wherein the lattice structure comprises a region with a twisted characteristic, and
wherein the lattice structure is affixed to a portion of the sole and to a portion of the crown insert and curves generally away from the front wall.

2. The driver-type golf club head of claim 1, wherein the lattice structure is composed of a non-metal material selected from the group consisting of plastic, nylon, polycarbonate, polyetherimide, polyetheretherketone, and polyetherketoneketone.

* * * * *